US009197668B2

(12) United States Patent
Boucher et al.

(10) Patent No.: US 9,197,668 B2
(45) Date of Patent: Nov. 24, 2015

(54) ACCESS CONTROL TO FILES BASED ON SOURCE INFORMATION

(75) Inventors: Peter Boucher, Orem, UT (US); Michael Wright, Sandy, UT (US); Tim Cranny, Sugarhouse, UT (US); Gabe Nault, Draper, UT (US); Merrill Smith, Riverton, UT (US)

(73) Assignee: NOVELL, INC., Provo, UT (US)

( * ) Notice: Subject to any disclaimer, the term of this patent is extended or adjusted under 35 U.S.C. 154(b) by 2242 days.

(21) Appl. No.: 11/330,530

(22) Filed: Jan. 11, 2006

(65) Prior Publication Data
US 2006/0120526 A1    Jun. 8, 2006

Related U.S. Application Data

(63) Continuation-in-part of application No. 11/176,999, filed on Jul. 7, 2005, and a continuation-in-part of application No. 10/897,060, filed on Jul. 21, 2004, now Pat. No. 7,526,800, and a continuation-in-part of (Continued)

(51) Int. Cl.
*H04L 29/00* (2006.01)
*H04L 29/06* (2006.01)
(Continued)

(52) U.S. Cl.
CPC ............ *H04L 63/20* (2013.01); *G06F 21/6218* (2013.01); *H04L 9/3247* (2013.01);
(Continued)

(58) Field of Classification Search
CPC . H04L 63/20; H04L 63/0227; H04L 63/0272; H04L 63/10; H04L 63/101; H04L 63/102; H04L 63/12; H04L 9/3247; H04L 2209/60; H04L 2209/80; G06F 21/6218; G06F 2221/2141

USPC ...................... 713/189, 193, 200; 726/27–30
See application file for complete search history.

(56) References Cited

U.S. PATENT DOCUMENTS 5,237,677 A    8/1993    Hirosawa et al.
5,335,346 A *  8/1994    Fabbio .......................... 711/163
(Continued)

FOREIGN PATENT DOCUMENTS

WO    WO 02/19116 A2    3/2002
WO    WO 02/067173 A1   8/2002

OTHER PUBLICATIONS

Aboba, Bernard, IEEE 802.1X Pre-Authentication, Jun. 17, 2002, Microsoft Corporation. Jun. 2002, pp. 1-47.

(Continued)

*Primary Examiner* — Michael Pyzocha
(74) *Attorney, Agent, or Firm* — King & Schickli, PLLC

(57) ABSTRACT

The present invention is a security tool for protection of data on a mobile computing device. The security tool provides a plurality of security policies to be enforced based on source information for the data and a location associated with a network environment in which a mobile device is operating. The security tool may be either located at the mobile computing device or at the server. The security tool includes a file access module for determining whether files are visible or accessible. The file access module comprises a tag generator, an association module, and a policy enforcement module. The tag generator creates source information for the file being accessed and the policy enforcement module determines what actions, if any, can be performed on the file and under what conditions such as location and network environment, type of file and other factors.

18 Claims, 12 Drawing Sheets

Related U.S. Application Data application No. 10/413,443, filed on Apr. 11, 2003, now Pat. No. 7,353,533, and a continuation-in-part of application No. 10/377,265, filed on Feb. 28, 2003, now Pat. No. 7,308,703.

(60) Provisional application No. 60/644,064, filed on Jan. 14, 2005, provisional application No. 60/687,188, filed on Jun. 3, 2005.

(51) Int. Cl.
  *G06F 21/62* (2013.01)
  *H04L 9/32* (2006.01)

(52) U.S. Cl.
  CPC ........ *H04L63/0227* (2013.01); *H04L 63/0272* (2013.01); *H04L 63/10* (2013.01); *H04L 63/101* (2013.01); *H04L 63/102* (2013.01); *H04L 63/12* (2013.01); *G06F 2221/2141* (2013.01); *H04L 2209/60* (2013.01); *H04L 2209/80* (2013.01)

(56) References Cited

U.S. PATENT DOCUMENTS

| | | | |
|---|---|---|---|
| 5,671,351 A | 9/1997 | Wild et al. | |
| 5,724,487 A | 3/1998 | Streit | |
| 5,922,073 A * | 7/1999 | Shimada | 726/6 |
| 5,930,810 A | 7/1999 | Farros et al. | |
| 5,987,611 A | 11/1999 | Freund | |
| 6,088,457 A | 7/2000 | Parkinson et al. | |
| 6,357,019 B1 | 3/2002 | Blaisdell et al. | |
| 6,484,261 B1 | 11/2002 | Wiegel | |
| 6,577,274 B1 | 6/2003 | Bajikar | |
| 6,580,914 B1 * | 6/2003 | Smith | 455/456.6 |
| 6,609,196 B1 | 8/2003 | Dickinson, III et al. | |
| 6,681,107 B2 * | 1/2004 | Jenkins et al. | 455/412.1 |
| 6,728,885 B1 | 4/2004 | Taylor et al. | |
| 6,772,213 B2 | 8/2004 | Glorikian | |
| 6,778,837 B2 | 8/2004 | Bade et al. | |
| 6,873,988 B2 | 3/2005 | Herrmann et al. | |
| 6,892,317 B1 | 5/2005 | Sampath et al. | |
| 7,069,581 B2 | 6/2006 | Fu et al. | |
| 7,075,912 B2 * | 7/2006 | Suda et al. | 370/331 |
| 7,093,283 B1 | 8/2006 | Chen et al. | |
| 7,353,533 B2 * | 4/2008 | Wright et al. | 726/1 |
| 7,478,420 B2 | 1/2009 | Wright et al. | |
| 7,519,984 B2 * | 4/2009 | Bhogal et al. | 726/2 |
| 7,526,800 B2 | 4/2009 | Wright et al. | |
| 7,542,475 B2 * | 6/2009 | Bar-Zakai | 370/401 |
| 7,636,936 B2 | 12/2009 | Wright et al. | |
| 7,890,640 B2 * | 2/2011 | Ribot | 709/229 |
| 2001/0038626 A1 | 11/2001 | Dynarski et al. | |
| 2001/0044849 A1 | 11/2001 | Ndili et al. | |
| 2002/0046253 A1 * | 4/2002 | Uchida et al. | 709/217 |
| 2002/0055817 A1 | 5/2002 | Chou | |
| 2002/0078361 A1 | 6/2002 | Giroux et al. | |
| 2002/0095486 A1 | 7/2002 | Bahl | |
| 2002/0095571 A1 * | 7/2002 | Bradee | 713/164 |
| 2002/0095615 A1 | 7/2002 | Hastings et al. | |
| 2002/0112046 A1 | 8/2002 | Kushwaha et al. | |
| 2002/0160745 A1 | 10/2002 | Wang | |
| 2002/0161905 A1 | 10/2002 | Haverinen et al. | |
| 2002/0166068 A1 | 11/2002 | Kilgore | |
| 2002/0184535 A1 * | 12/2002 | Moaven et al. | 713/202 |
| 2002/0186688 A1 | 12/2002 | Inoue et al. | |
| 2002/0191593 A1 | 12/2002 | O'Neill et al. | |
| 2003/0022673 A1 | 1/2003 | Bantz et al. | |
| 2003/0053475 A1 | 3/2003 | Veeraraghavan et al. | |
| 2003/0055962 A1 | 3/2003 | Freund et al. | |
| 2003/0065942 A1 | 4/2003 | Lineman et al. | |
| 2003/0070067 A1 | 4/2003 | Saito | |
| 2003/0074443 A1 * | 4/2003 | Melaku et al. | 709/224 |
| 2003/0081621 A1 | 5/2003 | Godfrey et al. | |
| 2003/0084323 A1 | 5/2003 | Gales | |
| 2003/0112178 A1 | 6/2003 | Bajikar | |
| 2003/0135749 A1 | 7/2003 | Gales et al. | |
| 2003/0159060 A1 | 8/2003 | Gales et al. | |
| 2003/0167405 A1 | 9/2003 | Freund et al. | |
| 2003/0177389 A1 | 9/2003 | Albert et al. | |
| 2003/0184474 A1 | 10/2003 | Bajikar | |
| 2003/0194500 A1 | 10/2003 | Masuda et al. | |
| 2004/0002343 A1 * | 1/2004 | Brauel et al. | 455/456.1 |
| 2004/0003289 A1 | 1/2004 | Bhogal et al. | |
| 2004/0010579 A1 | 1/2004 | Freese | |
| 2004/0015706 A1 * | 1/2004 | Eshghi et al. | 713/189 |
| 2004/0018844 A1 | 1/2004 | Cheng | |
| 2004/0052232 A1 | 3/2004 | Ramaswamy et al. | |
| 2004/0073654 A1 | 4/2004 | Sarma | |
| 2004/0192339 A1 | 9/2004 | Wilson et al. | |
| 2004/0203718 A1 | 10/2004 | Knauerhase et al. | |
| 2004/0203902 A1 | 10/2004 | Wilson et al. | |
| 2004/0203903 A1 | 10/2004 | Wilson et al. | |
| 2004/0215956 A1 | 10/2004 | Venkatachary et al. | |
| 2005/0091355 A1 * | 4/2005 | Keohane et al. | 709/223 |
| 2005/0125511 A1 * | 6/2005 | Hunt | 709/220 |
| 2005/0135315 A1 * | 6/2005 | Sinha | 370/338 |
| 2006/0097590 A1 | 5/2006 | Schill | |

OTHER PUBLICATIONS

Ark, Wendy S., et al., A Look at Human Interaction With Pervasive Computers, IBM System Journal, vol. 38, No. 4, 1999, pp. 504-507.

Balakrishnan, Hari, Pervasive Location-Aware Computing, MIT Laboratory for Computer Science, Presentation for "Talk on the Cricket system and future challenges in location-aware computing" on Nov. 29, 2001 (Distinguished Lecture Series, Dept. of Computer Science, Univ. of Virginia).

Barton, John J., A Cooltown Demonstration at Mobicom 2000, Internet and Mobile Systems Labs, Hewlett Packard Laboratory, [online], (retrieved on May 29, 2003). Retrieved from the Internet <URL: http//www.hpl.

Blunk, L. et al., "PPP Extensible Authentication Protocol (EAP)," RFC2284, Mar. 1998, <ftp://ftp.rfc-editor.org/in-notes/rfc2284.txt>.

Chakraborty, Anit, A Distributed Architecture for Mobile, Location-Dependent Applications, MIT, May 16, 2000, pp. 1-58.

Dey, Anid K., Building Context-Aware Applications, Aug. 13, 2002, [online], [retrieved on Feb. 5, 2003] Retrieved from the Internet <URL: www.inf.ethz.ch/vs/events/dag2002/ program/lectures/dey_1.pdf.

Grimm, Robert, et al., Future Directions: System Support for Pervasive Applications, *Proceedings of the International Workshop on Future Directions in Distributed Computing*, pp. 56-59, Bertinoro, Italy, Jun. 2002.

Grimm, Robert, et al., Systems Directions for Pervasive Computing, *Proceedings of the 8th IEEE Workshop on Hot Topics in Operating Systems (HotOS-VIII)*, pp. 147-151, Elmau, Germany, May 2001.

Harter, Andy, et al., The Anatomy of a Context-Aware Application, 1999, Retrieved from the Internet <URL: http://citeseer.nj.nec.com/cache/papers/cs/10242/ftp:zSzzSzftp.uk.research.att.comzSzpubzSzdocszSzattzSztr.1999.7.pdf/harter99anatomy.pdf.

It Knows You're Out There, Feb. 11, 2002, [online], [retrieved on Jun. 5, 2003]. Retrieved from the Internet <URL: http//www.80211-planet/com/news/print.php/972541>.

Location/context—Sensitive Application Development Platform Revealed for 802.11 WLANs. Sep. 7, 2001, [online], [retrieved on Jun. 5, 2003]. Retrieved from the Internet <URL: http//www.80211-planet.com.news/print.php/880761>.

Lopez de Ipina, Diego and Lo, Sai-Lai, LocALE: a Location-Aware Lifecycle Environment for Ubiquitous Computing, *Proceedings of the 15th IEEE International Conference on Information Networking (ICOIN-15)*, Beppu City, Japan. Jan. 31-Feb. 2, 2001, [online], [retrieved on Dec. 4, 2003]. Retrieved from the Internet <URL: http://www-lce.eng.cam.ac.uk/publications/files/tr.2001.9.pdf.

Michalakis, Nikolaos, PAC: Location Aware Access Control for Pervasive Computing Environments, MIT Laboratory of Computer Science, Cambridge, MA, USA. Jul. 25, 2002, [online], retrieved on Feb. 5, 2003].

Miu, Allen Ka Lun, Design and Implementation of an Indoor Mobile Navigation System, MIT, Jan. 2002, pp. 1-60.

(56) References Cited

OTHER PUBLICATIONS

Moore, B. et al., Policy Core Information Model—Version 1 Specification, The Internet Society, 2001, pp. 1-101.

Network Location Awareness Service Provider (NLA), Microsoft Corporation [online], [retrieved on Aug. 12, 2003]. Retrieved from the Internet <URL: http//www.msdn.Microsoft.com/library/en-us/winsock/network_location_awareness_servi>.

Newbury Networks Powers Royal Sonesta Hotel's Modern Art Exhibit for Wireless Location-Enabled Guided Tours; Newbury Networks, Inc., [online], [retrieved on Jun. 5, 2003]. Retrieved from the Internet <URL: http://www.newburynetworks.com/newsroom/press/press.php?id=9>.

Newbury Networks Debuts First Location-Enabled Networks Solutions for 802-11B WLANS; Newbury Networks, Inc., [online], [retrieved on Jun. 5, 2003]. Retrieved from the Internet <URL: http//www.newburynetworks.com/newsroom/press/press.php?id=8>.

Newbury Networks Introduces First Breakthrough Solution for Building Location and Context-Aware Applications for 802.11b Networks; Sep. 6, 2001; Newbury Networks, Inc., [online], [retrieved on Jun. 5, 2003]. Retrieved from the Internet <URL: http//www.newburynetworks.com/newsroom/press/press.php?id=7>.

Notification of Transmittal of International Search Report, PCT/US03/40546, Aug. 23, 2004, 10 pages.

Priyantha, Nissanka, et al., The Cricket Location-Support System, 2000, $6^{th}$ ACM International Conference on Mobile Computing and Networking (ACM MOBICOM), pp. 32-43, Boston, MA, USA.

Priyantha, Nissanka B., et al., The Cricket Compass for Context-Aware Mobile Applications, $7^{th}$ ACM Conference Mobile Computing and Networking (MOBICOM), Jul. 2001, pp. 1-14, Rome, Italy.

Priyantha, Nissanka B., et al, The Cricket Compass for Context-Aware Mobile Applications, Power Point Presentation, $7^{th}$ ACM Conference Mobile Computing and Networking (MOBICOM), Jul. 2001. pp. 1-14, Rome, Italy.

Radar Scope, Mobile Internet Times, vol. 4, Issue 10, Oct. 2001, Pinestream Communications, Weston, MA, USA.

Ward, Any, et al., A New Location Technique for the Active Office, IEEE Personal Communications, vol. 4, No. 5, Oct. 1997, pp. 42-47, [online], [retrieved on Dec. 4, 2003]. Retrieved from the Internet <URL: http://www.lce.eng.cam.ac.uk/publications/files/tr.97.10.ps.Z.

Ziola, Brad, Label Based Access Control vs. Fine-Grained Access Control for Implementing a Virtual Private Database, Managed Ventures, LLC, Mar. 2002, pp. 1-6.

Stallings, W., "Network Security Essentials, Applications and Standards," 2000, Prentice-Hall, pp. 203-223.

Office Action issued Dec. 3, 2009 in U.S. Appl. No. 11/926,371.
Office Action issued Jun. 10, 2010 in U.S. Appl. No. 11/926,371.
Office Action issued Dec. 8, 2010 in U.S. Appl. No. 11/926,371.
Office Action issued Jan. 10, 2011 in U.S. Appl. No. 11/926,454.

* cited by examiner

| File Name 402 | Source Address 404 | Privileges 406 |
|---|---|---|

Figure 4A

| File Name 402 | Source Address 404 | | | | | Privileges 406 |
|---|---|---|---|---|---|---|
| | Subnet 408 | Server 410 | Folder 412 | File 414 | Type 416 | Other Info. 418 |

Figure 4B

ACCESS CONTROL TO FILES BASED ON SOURCE INFORMATION

CROSS-REFERENCE TO RELATED APPLICATIONS

This application claims the benefit of U.S. Provisional Patent Application No. 60/644,064, filed on Jan. 14, 2005, entitled "System and Method of Filtering Access Points Presented to a User and Locking onto an Access Point." This application also claims the benefit of U.S. Provisional Patent Application No. 60/687,188, filed on Jun. 3, 2005, entitled "Access Control to Files Based on Source Information." This application is a continuation-in-part of U.S. patent application Ser. No. 11/176,999, filed on Jul. 7, 2005, and entitled "System and Method for Filtering Access Points Presented to a User and Locking onto an Access Point." This application is also a continuation-in-part of U.S. patent application Ser. No. 10/897,060, filed on Jul. 21, 2004 now U.S. Pat. No. 7,526,800, and entitled "Administration of Protection of Data Accessible by a Mobile Device." This application is also a continuation-in-part of U.S. patent application Ser. No. 10/413,443, filed Apr. 11, 2003 now U.S. Pat. No. 7,353,533, and entitled "Administration of Protection of Data Accessible by a Mobile Device." This application is also a continuation-in-part of U.S. patent application Ser. No. 10/377,265, filed Feb. 28, 2003 now U.S. Pat. No. 7,308,703, and entitled "Protection of Data Accessible by a Mobile Device." All of the above applications are incorporated by reference herein in their entirety.

BACKGROUND OF THE INVENTION

1. Field of Invention

This application relates to the field of security of data accessible by mobile devices. Mobile devices are using wired and wireless technologies to access networks at work, at home, or in public 'hot spots.' Those same mobile devices have documents, spreadsheets, e-mail, and other files with valuable company information if not valuable personal information in them.

2. Description of Related Art

The availability of wired and wireless network access points (NAP) allows mobile devices like laptop computers and personal digital assistants (PDAs) to enable users to be more mobile, providing access to corporate networks, e-mail, home networks and the Internet from anywhere. With the advent of the IEEE 802.11 standard for wireless communication, and other popular wireless technologies, software products that protect against unwanted access to information stored on mobile devices and corporate servers is highly desirable.

Traditional security architectures assume that the information assets being protected are 'tethered'—wired to a particular network infrastructure such as a company's network infrastructure. But mobile users can pick up valuable corporate information, such as by copying files from a server to a laptop, and walk away from the corporate network, and connect to other networks with different security policies. Users with laptops and mobile devices want to take advantage of wireless technologies, to connect wherever they are—at work, at home, in the conference room of another company, at the airport, a hotel, a highway or at the coffee shop on the corner. The mobile device's network environment is constantly changing as the user moves about. Each environment has different needs in terms of security. Each environment presents different challenges to protect the information on the mobile device while allowing access to e-mail, the Internet, and company Virtual Private Networks (VPNs).

Personal firewalls are designed to deal with static environments. A personal firewall could be ideally suited for mobile users if users knew how to adapt their configuration for their particular mobile application. Unfortunately, security settings for one situation can compromise data security in another. The configuration of popular personal firewalls typically requires a level of expertise on how the technology actually works that average users do not possess. For example, if a user improperly configures a personal firewall to trust a foreign network, his files may be vulnerable to unauthorized malicious attacks on his computer.

Solutions that secure data in transit, for example a (VPN) connection from a corporate server to a mobile client device, do not protect the data once it is stored on the mobile device. For example, an executive could be retrieving sensitive files or emails from the corporate network, and the VPN will stop eavesdroppers from seeing the data in transit, but once the data is stored on the executive's mobile device, hackers in the parking lot could break into the mobile device and copy or maliciously alter the data. With the onset of new powerful mobile devices that can store corporate data, IT managers see their network perimeters having to extend to the new limits of these mobile wireless connections.

Thus, there is a need for simple to use, mobile-aware security tools providing different levels of security protection for different locations and/or security features. There is also a need for different levels of security based on source or labeling of the data.

SUMMARY OF INVENTION

The present invention provides one or more embodiments of systems and methods for protecting data accessible by one or more mobile devices using security policies based upon criteria such as source information associated with the data and a location associated with a network environment in which each mobile device is operating. The present invention also provides an embodiment of a system and method for automatically labeling, tagging or creating source information for data or a file.

The system of the present invention includes a policy server for creating, maintaining and proliferating one or more security policies to mobile computing devices and servers. Each mobile computing device includes a security tool for enforcing security policies provided by the policy server. In a first embodiment of the present invention, security tool uses the source information and the location associated with a network environment in which each mobile device is operating to determine the accessibility of data. For example, based on the source information and current location associated with the mobile device, a file resident on the mobile device may be encrypted, may be hidden, may be transferable, may be partially accessible or fully accessible as required or recommended by a security policy. The security tool may be either located at the mobile computing device or at the server. The security tool includes a file access module for determining whether files are visible or accessible. The file access module comprises a tag generator, an association module, and a policy enforcement module. The tag generator creates source information for the file being accessed and the policy enforcement module determines what actions, if any, can be performed on the file and under what conditions such and location and network environment, type of file and other factors.

The present invention also includes various methods for using source information to control access to data including a method for determining whether files are visible, a method for determining whether files are accessible, and a method for generating source information for in response to a file request.

BRIEF DESCRIPTION OF THE DRAWINGS

FIG. 4A illustrates a first embodiment of a data structure for storing source information related to a file in accordance with the present invention.

FIG. 4B illustrates a second embodiment of the data structure for storing source information related to a file in accordance with the present invention.

DETAILED DESCRIPTION OF THE PREFERRED EMBODIMENTS

Figure 1A:
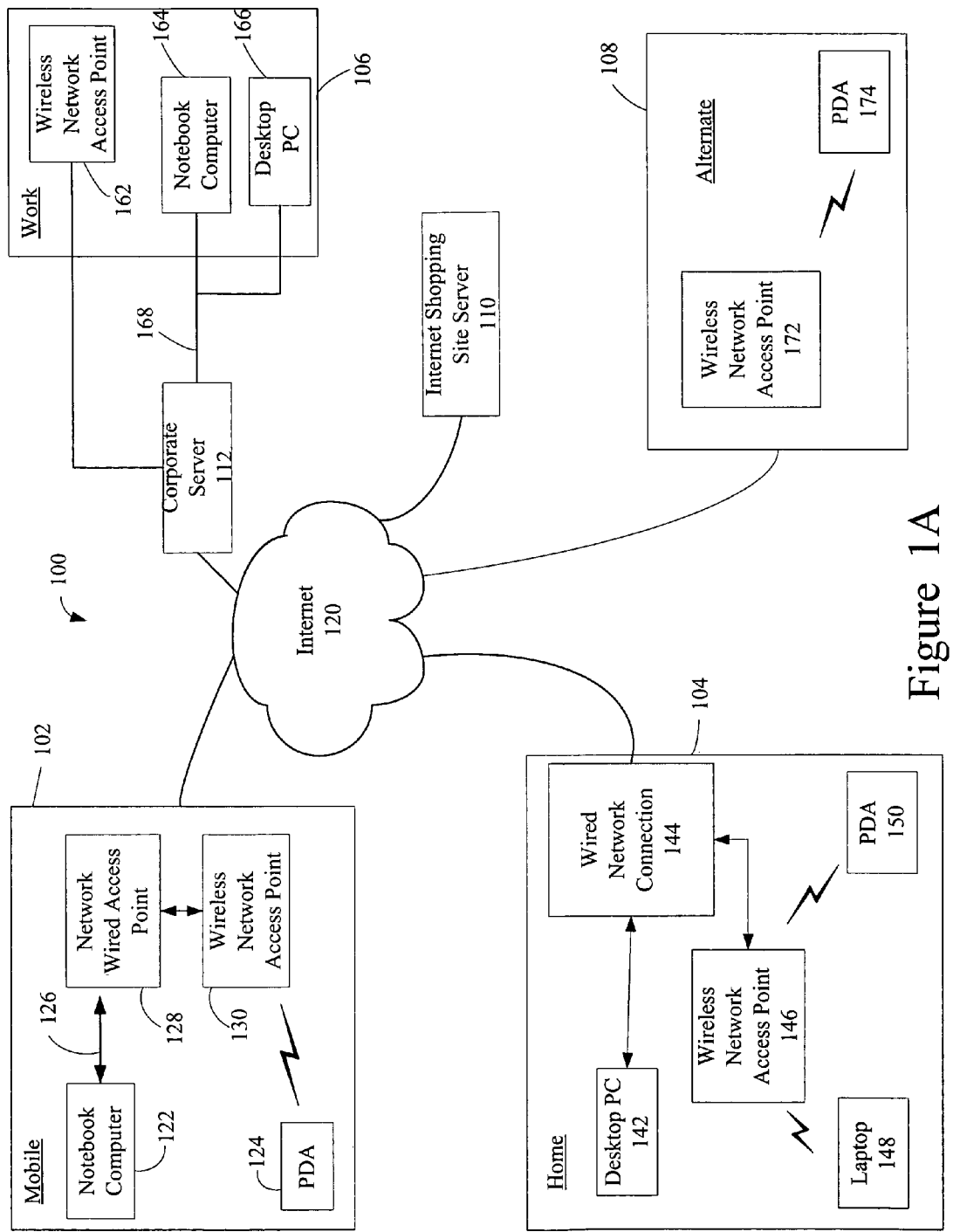
FIG. 1A illustrates one or more examples of location categories that may be assigned to a mobile device in accordance with an embodiment of the present invention.

FIG. 1 illustrates examples of location categories 102, 104, 106, 108 that may be assigned based on the network environment in which a mobile device is operating in accordance with an embodiment of the present invention. One example of a location category is "Home" 104. The network environment in which each of the mobile devices 148, 150 communicates via a network connection at a user's home is detected. Upon detection of this home network environment, each of the mobile devices 148, 150 is assigned a location indicator or type of "Home" 104. In the illustrated example, the laptop 148 and the PDA 150 communicating with the illustrated wireless network access point will have its location set to "Home."

The location "Work" 106 is an example of a location associated with a network environment maintained by a user's employer. In the illustrated example, a notebook computer 164 has a wired Ethernet connection 168 to the corporate server 112 of his or her employer. However, the notebook computer 164 may also communicate with the server 112 through a wireless NAP 162 as illustrated.

Another example of a location category is "Mobile" 102. For example, at an airport, a mobile device such as the illustrated notebook computer 122 accesses a network environment respectively through a wired connection 126 (in this example a T1 line) to a wired network access point 128. This wired network access point 128 may provide access to an Internet shopping site server 110 because the user desires to browse the site while waiting for departure. The notebook computer 122 and the personal digital assistant (PDA) 124 alternatively have a wireless connection to a wireless NAP 130, in this example an 802.11b connection through which they may communicate at the airport. Additionally, as discussed below, the security policy associated with the "Mobile" location may take into account the connection type of wired or wireless. In this example, the network environment provided at the airport does not match with a defined environment associated with a location such as "Work" 106 or "Home" 104 so "Mobile" 102 is assigned or associated with the PDA 124 and the notebook computer 122 as a default location.

The last location example is "Alternate" 108. In one example, a specific environment (e.g. an environment associated with a university computer lab or an environment associated with a type of network class) may be associated with "Alternate." Similarly, a "Custom" or another named location may also be defined. In this example, the wireless network access point 172 is associated with a cellular base station providing network access through a General Packet Radio Services (GPRS) system, Global System for Mobile communication (GSM) system, third generation wireless 3G system or other kind of mobile wireless communication system. A PDA 174 communicates wirelessly to the NAP 172 for access to the network 120.

System Overview

Figure 1B:
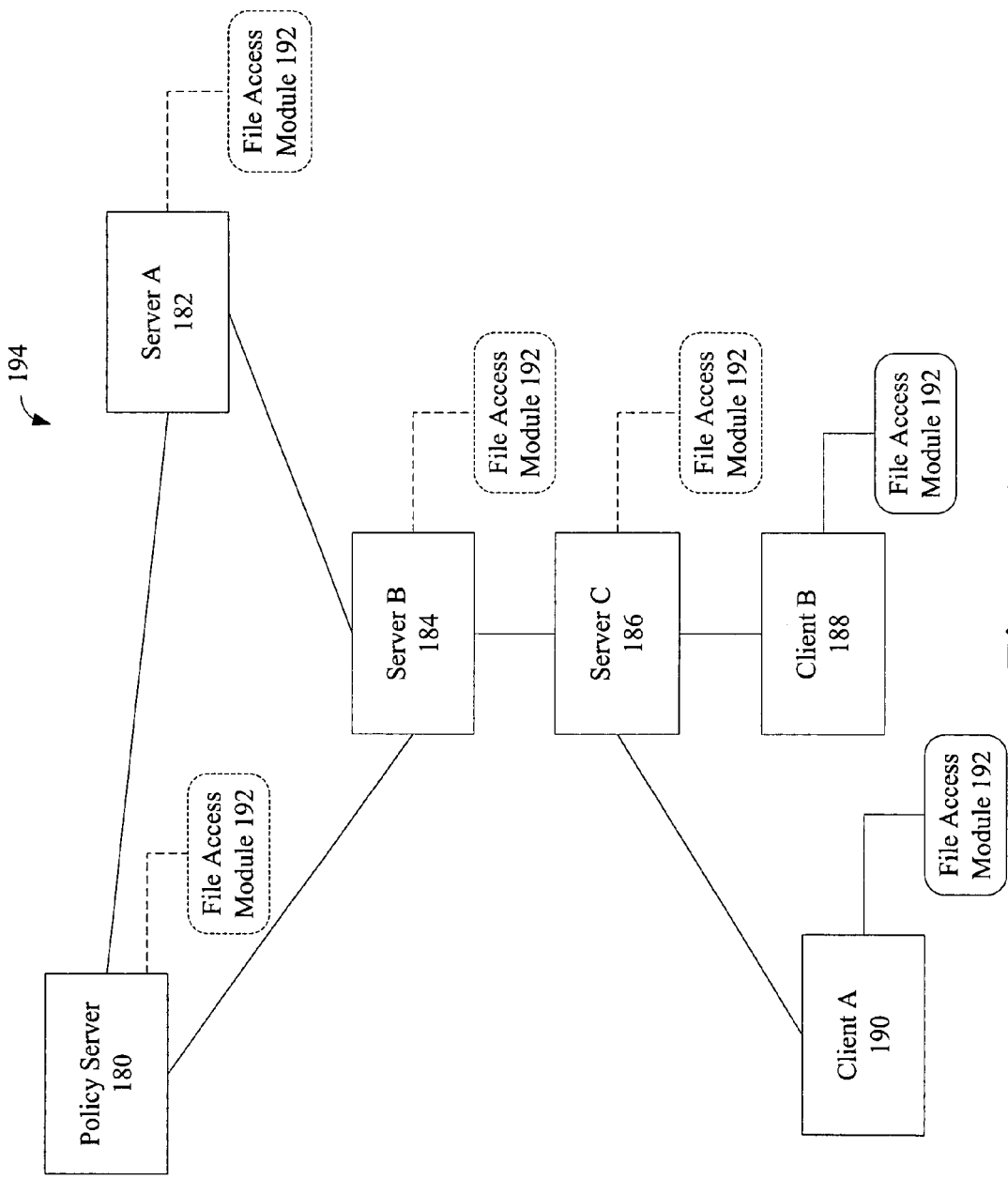
FIG. 1B illustrates a plurality of examples of a file access module in system of servers and clients in accordance with an embodiment of the present invention.

FIG. 1B illustrates a high level view of the present invention in an exemplary network 194. Those skilled in the art will recognize that the present invention may operate in any network configuration, and the network 194 shown in FIG. 1B is used for illustration purposes only. The present invention provides a file access module 192 that is used to control which files are visible and accessible. The file access module 192 can operate with a policy server 180, a server 182, 184, 186 or mobile computing devices 188, 190. The file access module 192 works with policy enforcement module 214, 244 as will be described in more detail below with reference to FIGS. 2A and 2B.

While a plurality of file access modules 192 are shown in FIG. 1B, it should be understood that are various embodiments of the present invention, and only one file access module 192 is required for a given embodiment. For example, in a preferred embodiment, file access modules 192 are not provided for the servers 180, 182, 184, 186, but rather only two file access modules 192 are provided and each operates in conjunction with the policy enforcement control module 214 of a client 188, 190. In another embodiment, there is a single file access module 192 that works with the policy server 180.

Those skilled in the art will recognize that there are various other configurations of one or more file access modules 192 each working with a server 180, 182, 184, 186 to control access and visibilities of files and also optimize traffic over the network 194.

Figure 2A:
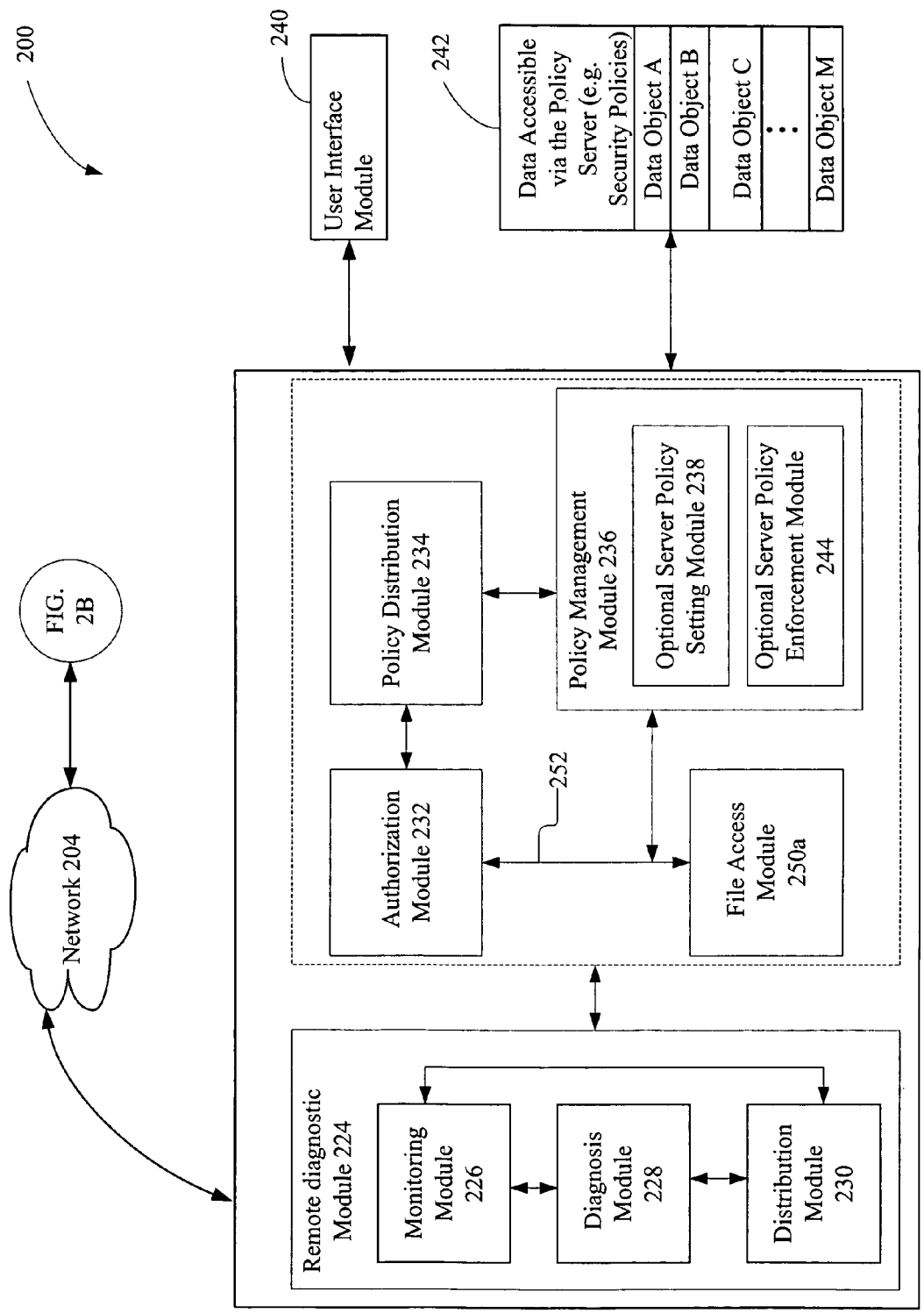
FIG. 2A illustrates a server or system for protecting of data accessible by one or more mobile devices based on a location associated with the mobile device and source information for the data requested in accordance with a first embodiment of the present invention.
Figure 2B:
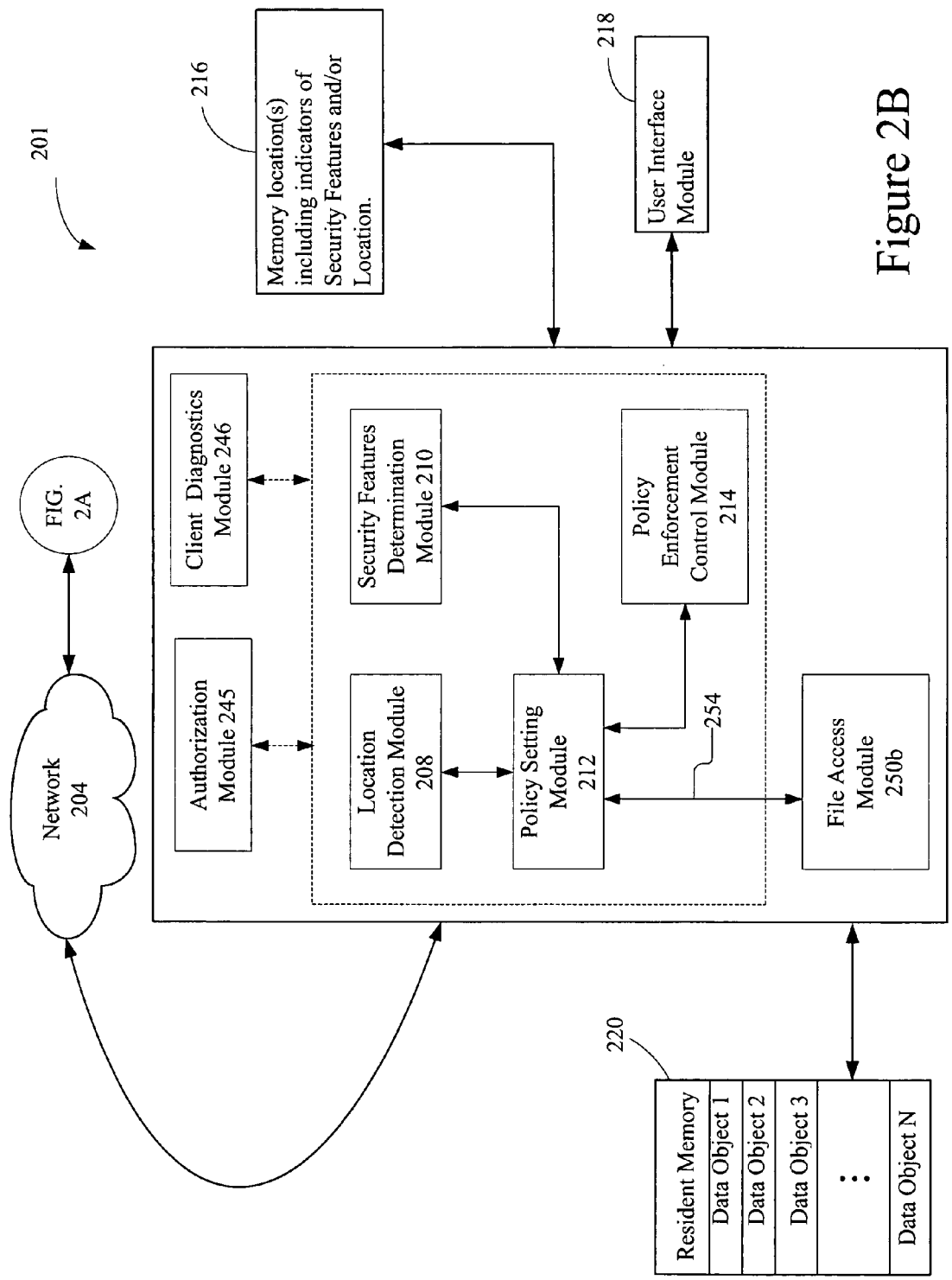
FIG. 2B illustrates a system in a client mobile device for protecting data accessible by the mobile device based on a location associated with the mobile device and source information for the data requested in accordance with the first embodiment of the present invention.

FIGS. 2A and 2B illustrate interaction between a computer system 200 (FIG. 2A) acting in a server role with respect to a mobile computer system 201 (FIG. 2B) acting in a client role for the purposes of managing security in accordance with an embodiment of the invention. Similarly, FIGS. 2A and 2B also illustrate interaction between the server computer system 200 and the mobile client computer system 201 for the purpose of providing diagnostic assistance to the client computer system. The system 200 in FIG. 2A may be implemented as software executing in a standalone computer having a processor being accessible to memory, the processor being communicatively coupled with one or more network interfaces, a display and input/output devices such as a keyboard and a pointing device. Similarly, the system 200 may be implemented by a series of networked computers as may typically be implemented by an enterprise. Additionally, the system 200 of FIG. 2A may be implemented on another mobile computing device 201. The server or server-side system 200 allows an administrator to manage and distribute policies and software upgrades, analyze logs, and perform remote diagnostics. The client system 201 in FIG. 2B may be implemented as software executing in a mobile computing device having a processor being accessible to memory, the processor being communicatively coupled with one or more network interfaces, a display and input/output devices such as a keyboard and a pointing device. The client side system 201 monitors the user's changes in location and/or security features and applies the appropriate policies automatically as the user moves about or different security features are activated or deactivated. The client 201 enforces the policies set up by the administrator, and performs diagnostics. The client 201 can also create and manage policies for the client mobile device when run in a self-managed mode. The server system 200 is discussed first.

Server System

FIG. 2A illustrates a system 200 for administering protection of data accessible by a mobile device based on a location associated with a network environment in which the mobile device is operating and a source label or tag for data being accessed. The illustrated system embodiment 200 comprises an authorization module 232, a policy distribution module 234, a policy management module 236, illustrated here with an optional server policy setting module 238 and an optional server policy enforcement module 244, a file access module 250*a*, a remote diagnostics module 224 and a user interface module 240. The system 200 protects data accessible by the mobile device that may be resident (See FIG. 2B, 220) or data 242 that is accessible by the mobile device over a network 204. Examples of such data may include security policies, corporate data, group files indicating the organization of personnel into various groups, client device management data, and diagnostic information related to the mobile devices or computers internal to the corporate network. As is apparent, these are examples of information valuable to a company. As illustrated, each of these modules has a communication interface or is communicatively coupled to each of the other modules and has access to data objects 242 stored in memory of the server 200 and also has access to a network 204 (e.g. Internet).

The policy management module 236 manages security policies. One aspect of managing security policies is defining the policies. In this example, the policy management module 236 comprises instructions for establishing this pre-defined criteria based upon user input processed by the communicatively coupled user interface module 240. Defining policies includes the creation of policies and the modification of policies. Examples of aspects of a policy includes specification of rules and permissions (e.g. policy override), defining one or more locations associated with network environments, defining or identifying security features to be monitored, ports to be monitored, network services to be monitored, applications to be monitored, enforcement mechanisms to be put in place for a particular policy, level identification for a policy or policy aspect for flexibility (optional, recommended, mandatory, invisible), and feedback (e.g. custom error messages) to alert an administrator via a user interface screen using the server system 200 of certain conditions or to alert a client device user via a user interface screen of certain conditions.

There may be several layers of policies. There may be a base policy applicable to a group of entities. Examples of entities may be users or the mobile devices themselves. In these examples, the group may include one instance of an entity. The attributes of the base policy may be incorporated into other policies that add additional attributes. For example, a base policy for the group including engineers in the user interface design department may be allowed access to files on a certain disk drive. Another policy based on location that incorporates the attributes of the base policy may only allow access to encrypted versions of the files if a mobile device through which a UI design engineer is logged in is operating in a "Home" network location. The optional server policy setting module 238 is discussed below in the discussion of the client policy setting module 212 of FIG. 2B. The optional server policy enforcement module 244 is discussed below in the discussion of the client policy enforcement control module 214 of FIG. 2B.

In one embodiment, the policy management module 236 is provided with an enterprise's existing group structures. The policy management module 236 compensates for a failing in the traditional makeup of groups. Since groups are not hierarchical, it is common for one person to be a member of several groups, and if each group has its own security policy, an issue arises as to how to determine which policy to apply to a particular user. The policy management module 236 inputs a prioritized list of groups from a memory location 242. According to one embodiment, the policy management module 236 searches the groups in priority order of the list. For example, if a person is a member of "engineering" and "executive staff," that person will get the security policy for whichever of those two groups comes first in the prioritized list. There can be a default policy for users who are not members of any of the groups on the prioritized list. Further, there can be a highest priority group that always has the highest priority. An example of such a group is a "stolen mobile device" group that always has the highest priority, because it doesn't matter what other groups the device is associated with if the device is in the hands of a thief. According to another embodiment, a user who is a member of several groups can be granted the security policy for the group associated with the least privileges.

The policy distribution module 234 distributes security information to the one or more client mobile devices. The policy distribution module 234 has a communication interface or is communicatively coupled to the policy management module 236 for receiving notifications of updated security information. Examples of security information are versions of existing policies, policies, or software. An example of communication interface is a bus between a processor executing one or more of the modules and a memory controller responsible for memory reads/writes. Another example is one module reading a parameter stored in a memory location by another module. Of course, other communication interfaces known to those of ordinary skill in the art may also be used.

In this embodiment, the authorization module 232 authorizes a communication exchange between the client mobile device and the policy distribution or policy management modules. The authorization module 232 is a further safeguard against unauthorized or rogue mobile devices trying to hijack the security policies or corporate data. Various authorization protocols and techniques may be used. One example is a simple username and password verification scheme. Another example of a type of authorization protocol is a cryptographic authentication protocol. The authorization module 232 may also be used to authorize a communication exchange between the client system 201 and the remote diagnostics module 224.

The file access module 250a is coupled to the authorization module 232 and the policy management module 236 by bus 252. The file access module provide sources information to the policy management module 236 so that policies can be modified based on the source information for the file requested in addition to location information about the mobile computing device 201. The file access module 250a, its components and operations are described in more detail below with reference to FIGS. 5A-9.

The remote diagnostics module 224 is illustrated in the context of a server 200 in FIG. 2A concerned with security or protection of data accessible by mobile client devices. However, the remote diagnostics module 224 may also function to provide diagnostic support for computer problems generally encountered by mobile client devices independently of security related software. In this embodiment, the remote diagnostics module 224 provides diagnostic assistance and/or corrective instructions with respect to problems not only associated with security but also provides such support with other problems generally encountered by mobile client devices. The remote diagnostics module 224 has a communication interface or is communicatively coupled with the user interface module 240, the authorization module 232, the policy management module 236 and the policy distribution module 234. This allows a person using the mobile device to get the device repaired where they are as opposed to having to mail the device or wait until he or she is back in the office to get help.

The remote diagnostics module 224 comprises three modules or sub-modules: a monitoring module 226, a diagnosis module 228, and a diagnosis distribution module 230. The monitoring module 226 receives diagnostic information such as events or audit logs from a client device and stores the information in a data object (242) for the client device. In one embodiment, a client diagnostics module (e.g. FIG. 2B, 246) periodically and automatically initiates tests. Results including errors from these tests are reported over a network 204 (e.g. Internet) to the remote diagnostics module 224. Other examples of diagnostic information retrieved from the client are debug output files, examples of which include system event logs, crash dumps, and diagnostic outputs from a client diagnostics module (e.g. 246, FIG. 2B). This information may be received periodically over a network 204 from the client diagnostics module 246, or upon an initial network connection by the mobile device with the server, or because the client diagnostics module 246 requests diagnostic assistance.

The diagnosis module 228 analyzes diagnostic information stored for the mobile device. For example the diagnosis module 228 may perform analysis according to pre-stored diagnostic programs or according to an interactive user environment or a combination of the two. The diagnosis module 228 may provide a repair to a problem in the client device, determine that a trend is occurring for the device, or determine that preventive maintenance is to be scheduled for the client device. In one example, the diagnosis module 228 initiates requests to the client mobile device for additional information. The additional information may be based on input received via the user interface module 240 or according to a pre-stored diagnosis method. In one embodiment, the diagnosis module 228 provides requested information to the user interface module 240 responsive to user input. In another embodiment, the diagnosis module 228 may provide requested information transmitted via the diagnostics distribution module 230 over the network 204 to the client mobile device responsive to requests received at a user interface module on the client device (e.g. FIG. 2B, 218). Once a diagnosis has been made with respect to a problem, support information may be distributed to the mobile device under the control of the diagnosis distribution module 230. For example, support information may be in the form of instructions or code to the client device to repair a problem or perform maintenance. This provides an advantage of taking corrective or preventive actions without requiring user intervention or action. Another example of support information that may be forwarded is messages for display by the client device providing a diagnostic report or requesting specific input from a user of the device.

Either the monitoring module 226 or the diagnosis module 228 may initiate tests and/or queries to determine the readiness or robustness of the existing client device population. Trends may be noted. Again, these tests may be run during a connection with a device without requiring user intervention.

The remote diagnostics module 224 may also probe a particular client to verify its status. For example, client configuration information may be retrieved such as the current version of the security policy software components on the client device, the current policy settings on the device, and attributes in accordance with those settings, for example, which ports are blocked. This information may be stored for later assistance in a diagnostics situation or for use with a current diagnostics situation.

In the system embodiment of FIG. 2A, the policy management module 236 defines a security policy applicable to a client mobile device based upon criteria. One example of criteria is the location associated with the network environment in which the mobile device is operating and source information. Other examples of criteria are the presence or the activity status of one or more security features. Of course, a combination of location and one or more security features may also form a criteria basis for defining a security policy. The policy management module 236 designates one or more client devices associated with the policy. In one example, this association may be based on an entity or class to which the security policy is applicable. An example of an entity is a group with one or more members. An example of a member may be a user of the client mobile device. A policy may be set that is applicable to the group of all engineers in the software development department. Another example of a member is the mobile device itself. For example, the capabilities of different mobile devices may be the basis for classifying them into different groups. In a secure manner, the policy management module 236 provides the one or more designated client mobile devices with authorization information for use in contacting the server system securely. One example of authorization information is an encrypted token provided by the authorization module to the mobile client device during a trusted connection between the two. An example of a trusted connection may be an internal connection behind the firewall of and within the internal network of the enterprise with which both the server system and the mobile client device system are associated. In one embodiment, a management server within the firewall in the internal network provides the authorization information. When a client mobile device connects via the Internet, it interacts with one or more of the enterprise side servers external to the firewall. The client contacts the external servers to retrieve policies and instructions. The external servers also perform key/identity management and policy persistence. The external servers communicate with the management server through the firewall for client management information such as a key, a user, a group, and version information associated with a client mobile device system. In a similar manner, responsive to security information such as a policy or software being designated for encryption, the policy management module 236 provides the designated client mobile device with cryptographic information that the client device can store and use to decrypt the security information. An example of cryptographic information is a key for use with a cryptographic authentication protocol. In one example, Microsoft® web keys may be used. The policy management module 236 sets the permissions for the one or more associated mobile devices with respect to the one or more policies. In one aspect, permissions typically relate to the allowable modification that may be made to a downloaded policy or client software by the client mobile device. Permissions may be applied to various policies and to the criteria upon which policies are defined. For example, there may be permissions set for a policy, but permissions may also be set with respect to a location. Some examples of permissions specific to policies are as follows:

Ability to see the tray icon
Ability to shut down the service
Ability to go to unmanaged mode
Ability to go to self-managed mode
Ability to change to a different policy server, or get a policy from another server in the same enterprise
Ability to not pull down new policies when they are available
Ability to get software updates directly from a vendor
Ability to launch the settings application
Ability to modify visual settings
Ability to modify feedback levels
Ability to see/modify server-defined global objects (for each type of object)
Ability to create new global objects (for each type of object)
Ability to see/modify global objects in the policy (for each type of object)
Ability to change the global objects used in the policy (for each type of object)
Ability to remove adapters from the policy.

Some examples of permissions specific to locations are as follows:

Ability to manually switch to a location
Ability to override a location.
Ability to manually switch to a different location
Ability to change enforcement mechanisms.

In one embodiment, in setting the permissions, for flexibility, a permission setting or a level of identification for each of the permissions may also be set. Some examples of these possible settings or levels are as follows:

Modifiable: The user has permission to modify the setting freely.
Recommended: The user has permission to modify the setting, but the application will recommend the policy's default.
Mandatory: The user does not have permission to modify the setting.
Hidden: The user does not have permission to view or modify the setting.

The policy management module 236 determines whether the security information is to be encrypted. If not, the policy management module 236 stores the security policy. If it is to be encrypted, the policy is encrypted. Similarly the policy management module 236 may also encrypted other types of security information such as software updates before they are stored. For example, the security policy may be stored as a data object in a memory 242 accessible via an internal enterprise network. In another example, security policies may be included in XML documents that may themselves be encrypted. In an alternate embodiment, the policy management module 236 may store the policy unencrypted, the policy distribution module 234 makes the determination of whether encryption applies to the policy or other security information, and the policy distribution module 234 encrypts the security information before distributing it. Additionally, in the embodiment of FIG. 2A, the policy management module 236 manages the one or more client devices for security purposes. One aspect of client management is that the policy management module 236 maintains client management information for the mobile device and the one or more policies associated with it. The following list of information fields is an example of the types of information that may be included in client management information.

User Name
Group
Connection state, which is one of:
    Connected
    Last connected time
    Never connected
Policy for this user
Policy version for this user
Software version for this user
Current enforcement mechanisms
Diagnostic level, including diagnostic options available in the client settings
Diagnostic information
Auditing level
Auditing information
Locations Previously Detected The information may be organized in a data object stored in a memory 242 accessible to the server computer system.

Through a user interface, a system administrator provides input indicating actions to be taken with respect to managing clients. In the embodiment of FIG. 2A, the user interface module 240 provides the input to the policy management module 236. In one example, a graphical user interface (GUI) for managing mobile client devices provides a list of information identifying directly or indirectly all mobile client devices that have connected to the server system, and has controls for managing them. Information displayed may be based on information sent during client-server negotiation. Below are some examples of actions to be taken for one or more client devices selected in accordance with user input.

Remove this client device from the current list of connected client devices (although the client device is re-added the next time he connects).
Change auditing level (to one of the options described below).
Change the diagnostic level.

View the diagnostic or event log for this client device.
Reassign this client device to another group.
Define Properties (e.g. required hardware, required software, data accessibility rights, data visibility rights.)

Mobile Device/Client System

FIG. 2B illustrates a system 201 for protecting data accessible by a mobile device based on source information and a location associated with a network environment in which the mobile device is operating. Additionally, the system 201 in FIG. 2B illustrates a system for determining and enforcing security policies based upon the activity status of a security feature in a communication session between the mobile device and another computer. The system 201 comprises a location detection module 208, a policy setting module 212, security features determination module 210, a policy enforcement control module 214, a file access module 250b, a user interface module 218, memory location(s) 216, an authorization module 245, and a client diagnostics module 246. The system 201 protects data accessible by the mobile device that may be in resident memory 220 on the device or data 242 accessible over a network 204. In this illustrated example, each of these modules has a communication interface or is communicatively coupled to each of the other modules. One or more of these modules may access resident memory 220.

The authorization module 245 provides authorization information to the authorization module 232 of the server 200 to establish communication exchanges with the client mobile device for the exchange of security information or diagnostic information or both. The client diagnostics module 246 collects diagnostic information that is sent to the remote diagnostics module 224 of the server system embodiment 200.

In one embodiment, the location detection module 208 receives network parameters from network 204 and detects or determines the location associated with the current network environment based upon criteria defined in a downloaded policy from the server system 200. In this example, the policy setting module 212 receives, installs and updates the security information including security policies and/or software updates received from the policy management module 236 via the policy distribution module 234 over the network connection 204. The policy setting module 212 may define criteria or if permissions set by the policy management module 236 allow, supplemental policy definitions or customization of policy definitions based upon user input processed by the mobile device user interface module 218. Similarly, if operating in a standalone mode not under the control of the server system, the policy setting module 212 defines an aspect of a policy such as location criteria or security features criteria based upon user input processed by user interface module 218.

In this embodiment, memory locations 216, including indicators of security features and/or location indicators, have a communication interface (e.g. a bus between a processor executing one or more of the modules and a memory controller responsible for memory reads/writes) to the location detection module 208, the security features determination module 210, the policy setting module 212, the policy enforcement control module 214, the authorization module 245, the client diagnostics module 246 and the file access module 250b. The location detection module 208 has a communication interface to the policy setting module 212. In the embodiment, the policy setting module 212 determines a security policy based upon the location detected by the location detection module 208 and communicated via a communication interface. In one example of the communication interface, the policy setting module 212 may read a current location indicator 216 updated in a memory location 216 by the location detection module 208. The policy setting module 212 may then read the location indicator 216 periodically or responsive to a notification message from the location detection module 208. In another example, the location detection module 208 may pass the currently detected location to the policy setting module 212 as a parameter in a message. Of course, other communication interfaces known to those of ordinary skill in the art for use in notifying the policy setting module 212 of the current location may also be used.

In another embodiment, the policy setting module 212 determines a security policy based upon source information as will be described in more detail below with reference to FIGS. 4A and 4B. In one example of the communication interface, the policy setting module 212 may read source information from the file access module 250 as the file is scanned for visibility or a read request is received for the file. In yet another and preferred embodiment, the policy setting module 212 uses both source information from the file access module 250b and location information from the location detection module 208 to set the security policy for the mobile device 201.

In an alternate embodiment, an optional server policy setting module 238 may operate on a server computer system such as the one illustrated in FIG. 2A that determines the selection of the current security policy for the mobile device based on criteria information received from the mobile device 201 including location and activity status of one or more security features or based on network parameters received from network 204. In this embodiment, a module on the client device such as the policy enforcement control module 214 receives commands from the optional server policy setting module 238 and executes them on the mobile device.

The policy setting module 212 also has a communication interface to a policy enforcement module 214. The policy enforcement module 214 comprises instructions for enforcing the security policy currently set by the policy setting module 212. The policy enforcement module 214 comprises instructions for one or more enforcement mechanisms associated with a security policy. Again, in an alternate embodiment, an optional server policy enforcement module 244 in a server computer system 200 with which the client device has a network connection 204 may send instructions to the mobile device for the enforcement of a security policy as determined by the optional server policy setting module 238 for the local device on the server side.

In this embodiment, a user interface module 218 has a communication interface to one or more of these modules 208, 210, 212, 214, 245, and 246. In one embodiment, the user interface module 218 receives input from a user input device such as a keyboard, mouse, or touchpad, and causes user interfaces to be displayed for use by a user for establishing criteria for defining an aspect of a security policy as allowed by permissions associated with the policy or when operating in a standalone mode not under the control of the server system 200.

The system 201 further comprises a security features module 210 for determining whether one or more security features have an activity status of inactive or active in a communication session between the mobile device and another computer. An example of a security feature is a connection type of wired or wireless. In one example, this connection type may be indicated by the association of the port over which data is communicated with a wireless or wired network adapter or network interface card (NIC). In another example, this connection type may be indicated by the association of a local IP address with data communicated over a wireless or wired network adapter or network interface card (NIC). In other embodiments, policies may be set based on particular features besides simply connection type. For example, a different security policy may be applied for different brands of NICs or particular classes (e.g. 802.3, 802.11a, 802.11b, GPRS, GSM) of NICs. Furthermore, different security policies may be assigned based on the operating system employed or the version of the operating system because different systems or versions provide different security features. Furthermore, different policies may be employed based on the security features (e.g. a firewall) provided by different types of network access points (NAP). Additionally, the presence or absence of upgraded NIC support for enhanced security protocols (e.g. 802.11i), or the presence or absence of security software such as virtual private network (VPN), or antivirus software, or intrusion-detection software may be the basis for setting different policies on a particular port, network adapter or data.

As with the location detection module 208, the security features module 210 has a communication interface to the policy setting module 212 in this embodiment as well as the memory locations 216. An activity status indicator field for the feature stored in the memory locations 216 may indicate the activity status of active or inactive for a security feature. The policy setting module 212 may be notified of the active features via the communication interface implemented in the same manner described in any one of the examples discussed above with respect to the location detection module 208 or in any manner known to those of ordinary skill in the art.

The policy setting module 212 communicates the current security policy to the policy enforcement control module 214 via a communication interface implemented in the same manner described in any one of the examples discussed above with respect to the location detection module 208 or in any manner known to those of ordinary skill in the art. The policy enforcement module 214 comprises one or more enforcement mechanism modules as specified by the policy. For example, in a communication session between the mobile device and another computer in which data is being transferred over a wireless connection, based on this connection type, in one example, the enforcement module 214 may prevent certain files from being transferred over the wireless connection as opposed to the cases in which the data is being transferred over a wired connection, or the case in which 802.11i cryptography is being used over the wireless connection. Again, in an alternate embodiment the optional server policy enforcement module 244 may operate as part of a separate computer system that transfers commands over a network to the mobile device. In the illustrated embodiment of FIG. 2B, a client diagnostics module 246 processes events and performs audits relating to processing performed by one or more of the modules. The client diagnostics module 246 transmits over a network 204 diagnostic information to the remote diagnostic module 224 on the server computer system. Examples of tasks that the client diagnostics module 246 performs in order to obtain diagnostics information are as follows:

Verify that correct files are in correct locations.
Verify (e.g. checksum) all files to verify no corruption.
Verify time/date stamps for correct versions.
Check for outdated installation (INF, PNF) files.
Verify that all registry entries are correct and correct any errors found. For example, it is verified whether the indications of the installation of the network interface cards (NICs) is accurate.

Examples of other tasks that the client diagnostics module 246 may perform to provide diagnostic information to the remote diagnostics module 224 on the server computer system 200 include enabling and disabling advanced debugging and sending debugging output to the server computer system 200. For example, enabling and disabling advanced debugging includes turning on system event logging with options including which parameters to log, when to log, etc. and allowing a debug version of a system component to be installed. In this example, the system event log or portions of it and any special debug output files that debug components generate are sent to the remote diagnostics module 224 on the server.

Second Embodiment of Server and Mobile/Client Devices

Figure 3:
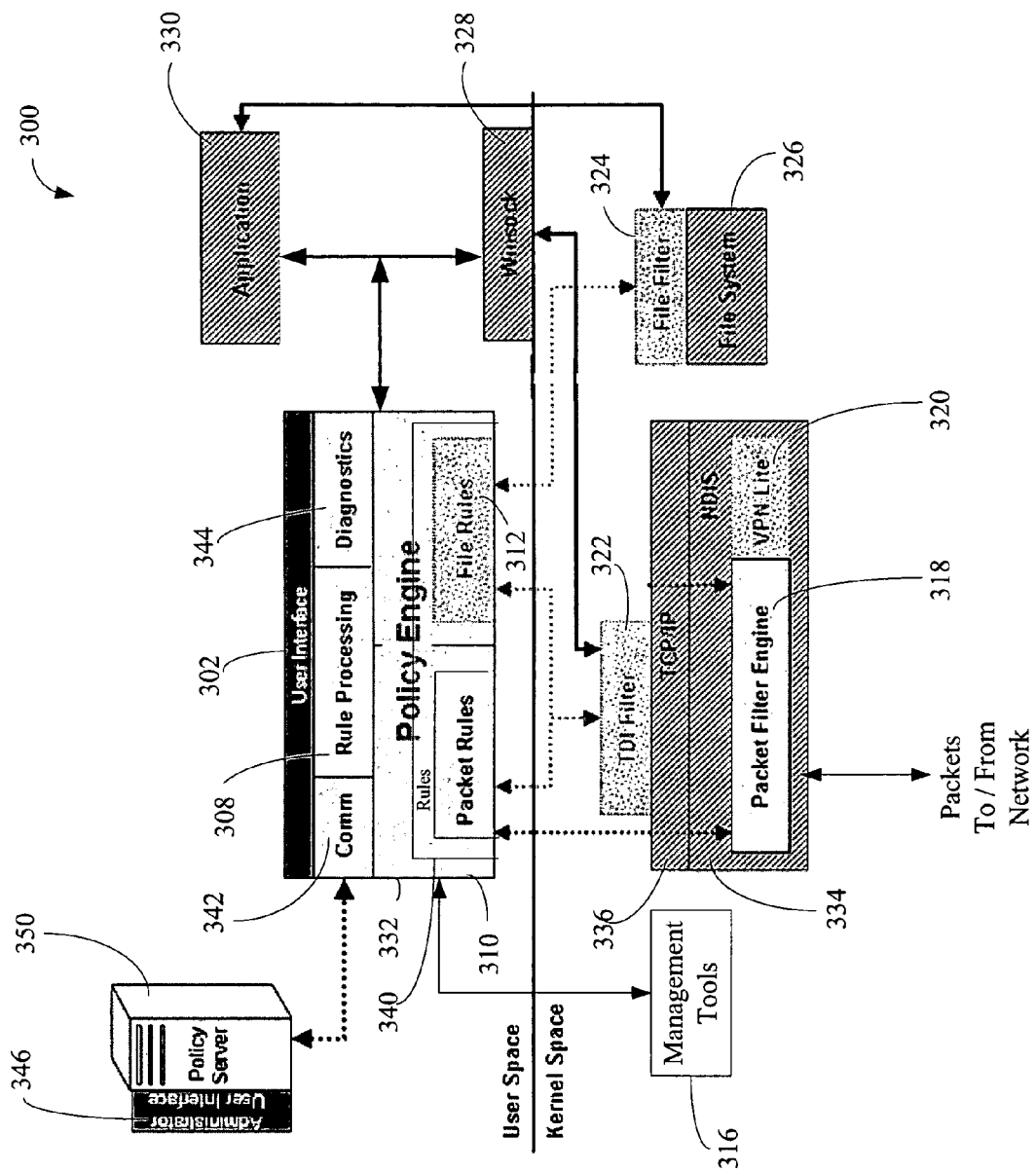
FIG. 3 illustrates a server system embodiment for administering the protection of data accessible by a mobile client device in accordance with second embodiment of the present invention.

FIG. 3 illustrates a second embodiment of a system including a server and mobile client device for protection of data accessible by the mobile client device. As illustrated, the system 300 comprises a policy server 350 having an administrator user interface 346. This system 350 is communicatively coupled over a network with the client side system through a communication port 342. Also, as is apparent to those of ordinary skill in the art, the policy server 350 may be implemented in one or more computers or computer systems. For example, it may comprise a management server executing on one machine for establishing communication sessions and a number of computers with which client devices may communicate in order to obtain their updates and receive diagnostic assistance.

The client side system embodiment comprises a policy engine 332 operating in application space having a communication interface to management tools 316 of the operating system, a communication interface to a file filter 324 operating in the kernel space that controls access to the file system 326, a communication interface to a user interface module 302, and also having a communication interface to a packet filter engine 318 operating within a driver 334. In this example, the driver 334 is an NDIS intermediate driver 334 operating within the kernel of the operating system of the mobile device.

The policy engine 332 further comprises a diagnostics module 344, a rule processing module 308, Rules 340 and representative examples of rules subsets, packet rules 310 and file rules 312. In addition to the packet filter engine 318, the driver 334 further comprises an application filter 322, in this example, implemented as a transport driver interface (TDI) filter 322 and a VPN module 320 embodied here as a VPN Lite 320 implementation discussed below. The TDI filter 322 comprises a communication interface with the packet rules subset 310 and the file rules 312 subset in this example. It also communicates with the packet filter engine 318 as part of the driver 334. The TDI filter 322 further comprises a communication interface with a Windows Socket (WinSock) layer 328 in application space. The Winsock layer implemented in this example as a Windows socket filter and communicates with one or more applications 330 in application space.

In this embodiment, network environment location detection is performed by the policy engine 332, in accordance with rules implementing one or more location detection tests in the Rules set 340, based on network parameters obtained by the NDIS driver for OSI layers 2-5, and by the TDI filter 322 for OSI layers 6 and 7. For example, the WinSock 328 captures information about network applications starting and stopping and what ports the applications will be using. This information is provided to the filter 318 and the policy engine 332 to provide application awareness. Furthermore, the policy engine 332, in accordance with the current security policy, provides rules with respect to applications. For example, the policy engine 332 may provide a list of which applications can or cannot access the network, as well as the target IP addresses and ports that they are or are not allowed to use. The policy engine 332 then enforces the current policy in accordance with these rules applicable to applications.

In this example, WinSock 328 is used to determine which application (e.g. browser e-mail application such as Outlook Exchange®) is accessing the network and what networking services the application will be using. An example of an application's network service usage could include Outlook Express opening a specific set of Winsock ports, each using a separate protocol and target I.P. address. The WinSock 328 will pass this information to the packet filter engine 318, which then informs the policy engine 332 using an event signaling mechanism. An example of an event signaling mechanism is to use named events to signal the policy engine 332 that some event has occurred.

Filtering of specific applications provides further resolution for location detection and enforcement mechanisms. The context of Microsoft® Networking provides an example of the benefits of such a filter. Several applications such as Exchange and Microsoft® File Sharing can and do use the same TCP and UDP ports. The NDIS filter driver 334 cannot determine which application is active based solely on TCP and UDP ports. The NDIS filter driver will act on the low level information i.e. TCP or UDP port numbers. When the packet arrives at the TDI layer 322, the TDI filter driver 322 determines based on one or more application parameters for which Microsoft Networking application a packet is destined and if the packet should be forwarded or filtered. For example, the TDI filter 322 provides to the driver, via IOCTL calls, "sessions" which provide information about applications opening ports for sending, listening (receiving), and details such as what protocol is being used and the target IP address of sent packets. Once the application closes the Winsock port, the TDI filter 322 can inform the packet driver that the session is now closed. These sessions allow the driver to be able to detect what incoming and outgoing packets should be allowed through the system and which packets should be forwarded or filtered.

A benefit of this embodiment is that it allows the NDIS filter driver 334 to do low level filtering based on port or protocol information and not have the overhead of application specific parsing. A modular approach to packet and application filtering is allowed.

The policy engine 332 also has a communication interface to management tools 316 of the operating system. The management tools 316 provide information to the policy engine 332 such as the types of adapters connected to the mobile device and specific information about each of them such as their brand name. The policy engine 332 also receives from the management tools 316 the local IP address associated with each adapter. Additionally management tools 316 alert the policy engine 332 that applications are running. For example, a process table maintained by the operating system may be monitored and notifications sent by the management tools 316 to the policy engine 332. For example, it may be determined whether 802.11i wired equivalency protection (WEP) software is running on a network adapter card through which wireless data is being sent and received. In this way, the policy engine 332 determines which security features are available in a system.

The policy engine 332 may create a security policy that is not inconsistent with the policies downloaded from the policy server 350. Additionally, modification and local management of policies as allowed, for example in accordance with permissions of policies set by the policy server 350. The Policy Engine 332 receives user input and sends output via a communication interface with the user interface module 302 to display and change policy settings responsive to user input.

Rules 340 comprise rules that define one or more security policies to be enforced by the policy engine 332. The policy engine 332 comprises a rule processing module 308 which executes tasks in accordance with determinations to be made as set by the rules for the current security policy and for directing the appropriate results dictated by the rules of the current policy.

In one embodiment, rules are pairings of logically grouped conditions with results. The following are examples of conditions, which may be connected by logical operators:
  Check for the existence of a registry key
  Check for a registry value
  Check for the existence of a file
  Check for a currently running application
  Check for a currently running service
  Check for the existence of network environment settings (includes a list of environments)
  Verify that specified applications are running
  Verify that specified protocols are enabled
  Verify that specified VPN is running
The following are examples of results:
  Can/Can't use the network
  Can/Can't use the machine
  Locked in to a certain location
  Can/Can't access the file
  Can/Can't use the application
  Only transfer encrypted version of file.

Examples of subsets of rules are illustrated in FIG. 3, packet rules 310 and file rules 312. These subsets illustrate examples of enforcement mechanisms that may work at different layers of a communication model, for example at the network layer and at the application layer.

One example of an enforcement mechanism is referred to as stateful filtering. In one example, a security policy is called a type of shield or is referred to as a particular type of shield level. The state may hereafter be referred to as the shield state or shield.

If the filtering is performed on a packet basis, it is referred to as stateful packet filtering. In stateful packet filtering, a packet filter such as the packet filter engine 318 as its name suggests filters packets based on a state set by the currently enforced policy with respect to a parameter. Examples of such a parameter include source IP addresses (for received packets) or target IP addresses (for sent packets), port numbers, port types or a port group. A port group is a list of ports that are used by a particular application, network service or function. For example, a port group can be created that includes all the ports for a particular instant messaging application, or for all supported instant messaging applications, or for all applications used internally at a company. Examples of port groups that may be selected for processing by a policy include web surfing ports, gaming ports, FTP and SMTP ports, file sharing and network ports, and anti-virus updates and administration ports. A port group can contain individual port items or other port groups.

In this example, we discuss a version of stateful filtering called adaptive port blocking. In this example, there are rules comprising a mapping between a set of ports, port types, and actions. The ports are the actual port numbers, the port types enumerate the possible port types e.g. UDP, TCP, IP, or Ethertype, and the actions are what is to be done with this particular port e.g. filter, forward, or inform. The inform action will post an event to the policy engine 332 when a packet is sent or received on the specified port. Filter and forward action control the sending and receiving of packets on the specified port.

In one example, a policy is in effect that each port is in one of three modes: open, closed, or stateful. When the port is open, all traffic (both incoming and outgoing) on that port is permitted to flow through the packet filter. When the port is closed, all traffic on that port is blocked (both incoming and outgoing). When the port is stateful, all outgoing traffic on that port is permitted to flow through the packet filter, and incoming responses to that outgoing traffic are allowed back through, but unsolicited incoming traffic is blocked. In another example, incoming and outgoing traffic may be blocked on a basis, examples of which are a network service or an application.

In the system embodiment illustrated in FIG. 3, components such as the policy engine 332, the packet filter engine 318 and the TDI filter 322 may be employed for supporting stateful filtering. In one example, a session is created when a mobile device initiates communications with a particular remote or a specified set of remote computing devices. The stateful filtering, as may be performed by the packet filter engine 318 and/or the TDI filter 322 in accordance with rules 340, for example rules in the subset of the packet rules 310, applicable to the current policy, may use the transport protocol to determine when a session is starting and the address of the remote device. Forward and filter decisions in accordance with rules in the set of rules 340 or the subset of the packet rules 310 may be based upon the session information obtained at session startup. Additionally, forward and filter decisions may be based on application parameters received via the TDI filter 322. This provides the benefit of more refined application filtering as illustrated in the example discussed above.

The policy engine 332 will pass the rules to the packet filter engine 318 as commands using the existing IOCTL interface. In one example, the policy engine determines based upon its current rules which ports or range of ports should do stateful filtering. These rules are then passed to the packet filter engine 318 by an IOCTL command. In another example, the policy engine 332 determines that rules of the current security policy do not support certain applications accessing a network. These rules are passed to the packet filter engine 318 as well as the TDI filter 322 for application specific filtering. The policy engine 332 may also pass rules about application-specific network access to the TDI filter 322 via an IOCTL interface.

Each component of the system may also provide health checks on the others. For example, the policy engine 332, the file filter 324, and the packet filter engine 318 report whether any of the other services have been disabled or removed from the system to the diagnostics module 344. This information may be relayed to the policy server 350 as it indicates a possible compromise of the protective system. The policy server 350 in that case provides diagnostic support information to the diagnostics module 344.

Stateful packet filtering deals with packets with different types of addresses. Outgoing packets have three different types of addresses: directed, multicast, or broadcast. Directed addresses are specific devices. Broadcast packets are typically used to obtain network configuration information whereas multicast packets are used for group applications such as NetMeeting®.

To establish session state information with a directed address is straightforward. The IP address and the port number are recorded in a session control block. When the remote responds the receive side of the filter engine will forward the packet because a session control block will exist for that particular session.

When the outgoing packet is a multicast packet there is a problem. Multicast packets are sent to a group; however, a multicast address is not used as a source address. Hence any replies to the outgoing multicast will have directed addresses in the source IP address. In this case the filter engine will examine the port to determine a response to a given multicast packet. When a response to the specified port is found a session control block will be completed i.e. the source address of this incoming packet will be used as the remote address for this particular session. However, more than one remote may respond to a given multicast packet, which will require a session control block be created for that particular remote. The broadcast packets may be handled in the same manner as the multicast.

The file rules subset 312 have a communications interface such as an IOCTL interface with a file filter 324 having a communication control interface with a file system 326. The file filter 324 may implement one or more filter related enforcement mechanisms. A policy may protect files based on the location in which they are created and/or modified as well as the location in which the mobile device is operating. The policy specifies a set of locations in which the files are to be made available, and whenever the mobile device is not operating in one of those locations, those files are unavailable. In another embodiment, policies may require that files be encrypted only if they were copied from certain network drives.

One reason for requiring that all files created and/or modified in one of the specified locations is so that copies of sensitive files or data derived from the sensitive files are also protected. Specific mechanisms for protecting the files include file hiding and file encryption.

When the mobile device is operating in one of the specified locations, the files can be located (e.g., they are not hidden). When the mobile device is operating in some other location, the files are hidden. One purpose of this mechanism is to prevent the user from accidentally revealing the contents of sensitive files while in locations where access to those files is not authorized.

One mechanism for hiding the files is to simply mark them "hidden" in their Windows properties pages, and to cache the access control list (ACL) on the file and then modify the permissions to deny all access by non-administrators. Other versions may use the file-system filter to more effectively render the files unavailable. Another way of protecting files is by preventing them from being opened.

In one embodiment, files that are subject to location-based protection by the policy are always stored encrypted. When the mobile device is associated with one of the specified locations, the files can be decrypted. When the mobile device is associated with some other location, the files cannot be decrypted. This mechanism provides a benefit of preventing unauthorized persons who may have stolen the device from gaining access to sensitive files.

One mechanism for encrypting the files is to simply mark them "encrypted" in their properties pages, and to rely on the file hiding feature (see above) to stop the files from being decrypted in an unauthorized location. Other versions may use the file-system filter to more effectively encrypt the files in a way that does not depend on the operating system to prevent them from being decrypted in an unauthorized location.

Policies can have rules controlling the use of VPNs. For example, a rule can require that when the VPN is in use, all other ports are closed. This prevents hackers near the user from co-opting the user's device and coming in to the corporate network over the user's VPN connection. In one embodiment, a lightweight web-based VPN is used that allows traffic from selected applications (e.g., email) to be encrypted with Transport Layer Security (TLS).

In one embodiment, a VPN Lite 320 having a communication interface with the packet filter engine 318 establishes a TLS-encrypted, authenticated connection with the server, and then sends and receives traffic over this connection. The TDI filter 322 diverts the outgoing traffic from the application to a VPN client piece 320, and incoming traffic from the VPN client piece 320 to the application.

In one implementation example in accordance with the present invention a layer is inserted into the Winsock environment, which opens up a Transport Layer Security (TLS) or Secure Socket Layer (SSL) socket to the VPN server, and tunnels all application network traffic through that connection to the VPN server. The applications are unaware that the VPN is active. The VPN has a very small footprint, since TLS is included in Windows®. In this example, using the Winsock Environment, all communication between client and server is routed through a secure channel. Unlike current clientless VPNs, all existing applications are supported.

As seen in the embodiment of FIG. 3, the packet filter engine 318 and the TDI filter 322 comprise implementation examples of functionality for processing network traffic. The policy engine 332 performs implementation examples of functions of determining location analogous to those of the location detection module 208, of determining policies analogous to those of the policy setting module 212 and of identifying active security features analogous to those of the security features determination module 210. Furthermore, the packet filter engine 318 and the TDI filter 322 also perform implementation examples of enforcement mechanisms that the policy enforcement control module 214 may analogously perform.

The diagnostics module 344 of the policy engine 332 performs similar functions discussed with respect to the client diagnostics module 246 of FIG. 2B. For example, it provides status, configuration, error logs, audit logs, and debug information to the server system. Similarly, it would assist a server side remote diagnostics module such as module 224 in FIG. 2A in debugging an error.

In one embodiment, policy documents are XML documents. XML allows great flexibility in design, usage, and enhancement of policies. Using the flexibility of XML as the means to distribute enterprise wide policies simplifies the complex problem of distributing and enforcing enterprise wide policies. Policies are defined by the enterprise including but not limited to program usage, network access, hardware restrictions, VPN access, data access, and many other policies. The definition of these policies is performed at the enterprise level using XML schemas and documents. The policies may then be distributed to the enterprise clients via various forms of data transfer. Furthermore, the policies may also be protected from hacking by encryption or signatures (i.e. XKMS, XMLDSIG, XMLENC, or proprietary encryptions). The policy is then enforced on the client by a process that can interpret the policy distributed by the enterprise. This approach allows a policy to be extensible and easily changed by the administrator. Furthermore, policy management, compilation and interpretation are performed by policy aware application interfaces. Also, the administrator can configure elements of the policy such that they are configurable by the end user. In one example, the XML schema or XSD is derived from the standard XML schema http://www.w3.org/2001/XMLSchema (May 2001). In this example, a schema defines one set of types that is used by both the server (group) and the client policies. Policies may be signed to ensure integrity. Additionally individual policy elements will be signed to ensure integrity of policy enforcement.

In one embodiment, a very thin client host application resides on a client mobile device. For example, it may be part of the policy setting module 212 for the embodiment of FIG. 2B or part of the policy engine 332 in FIG. 3. The central policy server or server system 350 pushes execution instructions to the client, described by XML. As a result, a small relatively stable execution environment is available as part of the client device. When additional or different functionality is needed on the client, this new functionality is pushed to the client in an XML format.

For example, assume version vX.01 of a product supports two types of security policies. For version X.02 it is necessary to implement a third type of security policy. The implementation and associated behaviors of the policy would be described within XML and published to the clients via the policy server. Clients running vX.01 would then effectively be upgraded without user intervention. In another example, this approach could be used for instantiating portions of an application to clients in a cafeteria style—e.g. they want features 1, 2, 3, 6, 8 and not 4, 5, 7. If the client requires a change to their implementation, they change their menu selections and implementation and behaviors are pushed to their respective client instances.

File Access Module

A key aspect of the present invention is an ability to control access to files whether stored on the network at any of the servers or stored on the mobile client device. Such control over access includes whether they are stored on the mobile computing device, as well as whether they can be transferred from the mobile computing device, under what conditions and what ports or media. The present invention advantageously uses "source information" about the file or data being accessed in addition to location of the mobile device to dynamically establish a security protocol for that file and determine whether the file is visible and/or accessible.

Referring now to FIGS. 4A-9, the file access module 192, 250*a*, and 250*b* will be described in more detail. The present invention uses what is referred to throughout this application as "source information" in determining the security setting and policy for access and transfer of files and data to/from the mobile computing device. One embodiment for the "source information" is shown by a representative record 400A in FIG. 4A. In this embodiment, the source information 400A preferably comprises a file name 402, a source address 404 and privileges 406. The file name 402 is any name as provided by the user to identify the file or data. The source address 402 in this embodiment is an identifier that specifies the storage location where the file is stored on the network 120. Finally, the privileges 406 identify specific access control limitations that are imposed on the file or data. For example, the file may have privileges 406 such that it cannot be stored on the mobile computing device 201 and may only be viewable on the mobile computing device 201. In one embodiment, the privileges 406 identify one or more specific actions that can or cannot be taken and under what conditions. In a second embodiment, the privileges 406 are a set of rules that may be applied by a policy enforcement module 214 alone or in conjunction with other rules applied by the policy enforcement module 214. Those skilled in the art will recognize that that the record 400A of FIG. 4A is just one embodiment for the source information, and the source information may include other fields and may exclude one or more of the fields shown.

FIG. 4B shows a second embodiment for the source information. The second embodiment of the source information is illustrated using record 400B of FIG. 4B. The second embodiment preferably comprises a file name 402, a source address 404 and privileges 406 with similar form and function as the embodiment described above with reference to FIG. 4A. However, in the second embodiment, the source address 404 includes more information and preferably has a plurality of sub-fields including: a subnet field 408, a server field 410, a folder field 412, a file field 414, a type field 416, and other information field 418. The subnet field 408 is the name of the subnet network (or independent, segment, or domain of the network) upon which the file is stored. The server 410 is the name of the server upon which the file is stored. The folder 412 is the folder name in which the file is stored. The file 414 is an identifier for the file, and the type 416 is the file type. The source address 404 may also include other information 418 such as the owner of the file, version control information, a hash value, a cyclical redundancy check, a digital signature or other tags extracted from the content of the file or data. For example, such a tag could be whether the information is proprietary and confidential as could be extracted from a document footer or some other part of the file.

Figure 5A:
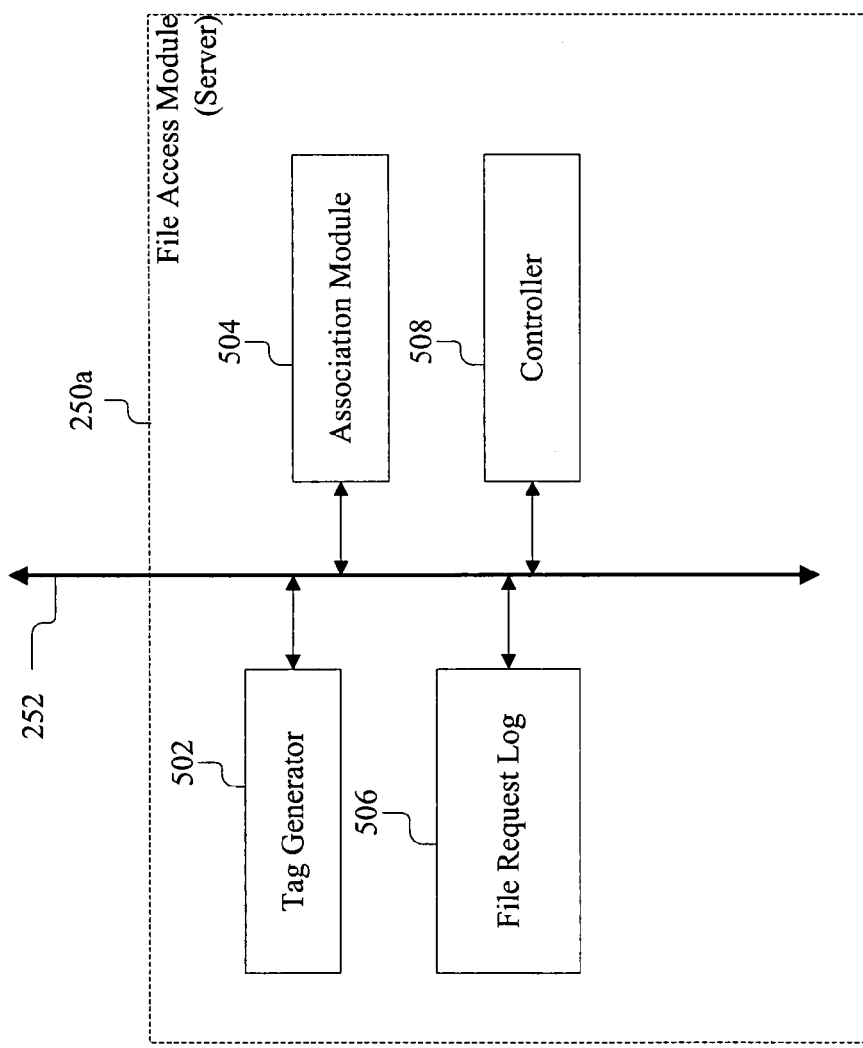
FIG. 5A is a block diagram of a first embodiment of the file access module in accordance with the present invention for use in a server.

Referring now to FIG. 5A, a block diagram of a first embodiment of the file access module 250*a* in accordance with the present invention for use in a server 200 is shown. The first embodiment of the file access module 250*a* preferably comprises a tag generator 502, an association module 504, a file request log 506, and a controller 508 each coupled to a bus 252. These components are also coupled by bus 252 to the authorization module 232 and the policy management module 236 of the server 200 as have been described above with reference to FIG. 2A. This embodiment of the file access module 250*a* is implemented at the server 200 and also provides the server 200 with the ability to monitor which files on the network 120 have been accessed. These components will be briefly described here, but are also describe below with reference to FIGS. 6-9 as they implement the operations of the present invention.

The tag generator 502 has an input and an output and is coupled to work with the controller 508 to determine the source information for the file being accessed. The tag generator 502 is responsive to a file request or access, and in response generates a tag, label or record 400 as has been described above with reference to FIGS. 4A and 4B. In one embodiment, the tag generator 502 creates the tag after the request for a file has been received by the server, and sends the tag or label to the client before transferring the file. The tag generator 502 can operate at each layer of the network stack. The tag generator 502 also communicates with and is coupled to the association module 504 to manage the tags that are generated and ensure they are unique and not duplicated in the name space.

The association module 504 has an input and an output, and is coupled to bus 252. The association module 504 works with the controller 508 to manage the name space and ensure that tags are unique for the files. In one embodiment, the association module creates a unique identification number that is provides to the tag generator 502 to ensure that each record created for file access or visibility is unique. The association module 504 also manages the relationships of the records to the files such that is the files are modified, moved or otherwise altered, the corresponding records are modified and invalidated if necessary.

The server version of the file access module 250*a* also optionally includes the file request log 506. The file request log 506 is maintained and updated by the controller 508. The file request log 506 is coupled to bus 252 to receive updates as to which files are accessed, read and written. In one embodiment, the file access log 506 records which files were accessed, to which client 201 they were sent or accessed by, and the tag or label that was provided to the client 201. The file request log 506 is shown as being in memory of the file access module 250*a*, but those skilled in the art will recognize that it is advantageous to store all or part of the file request log 506 on a non-volatile storage medium. If a breach in security is later detected, the file request log 506 can be used forensically to help determine the source of the file, the instances when the file was transferred or accessed, and possible clients and servers that are not enforcing a security policy correctly. The file request log 506 would be reviewed to perform such analysis whether it was programmatically or manually.

The controller 508 is of a conventional type and is coupled to the bus 252 for communication and interaction with the tag generator 502, the association module 504, the file request log 506 and the server 200. In particular, the controller 508 works with the authorization module 232 and the policy management module 236 of the server 200. For example, the authorization module 232 may only provide the file and access if they have security software with an appropriate policy on the client device, or if they have the security features operable at the client to allow access and transfer of the file. As has noted above, a key feature of the present invention is to use both the source information and the location information to determine the appropriate security policy and enforce it upon the mobile client devices.

Figure 5B:
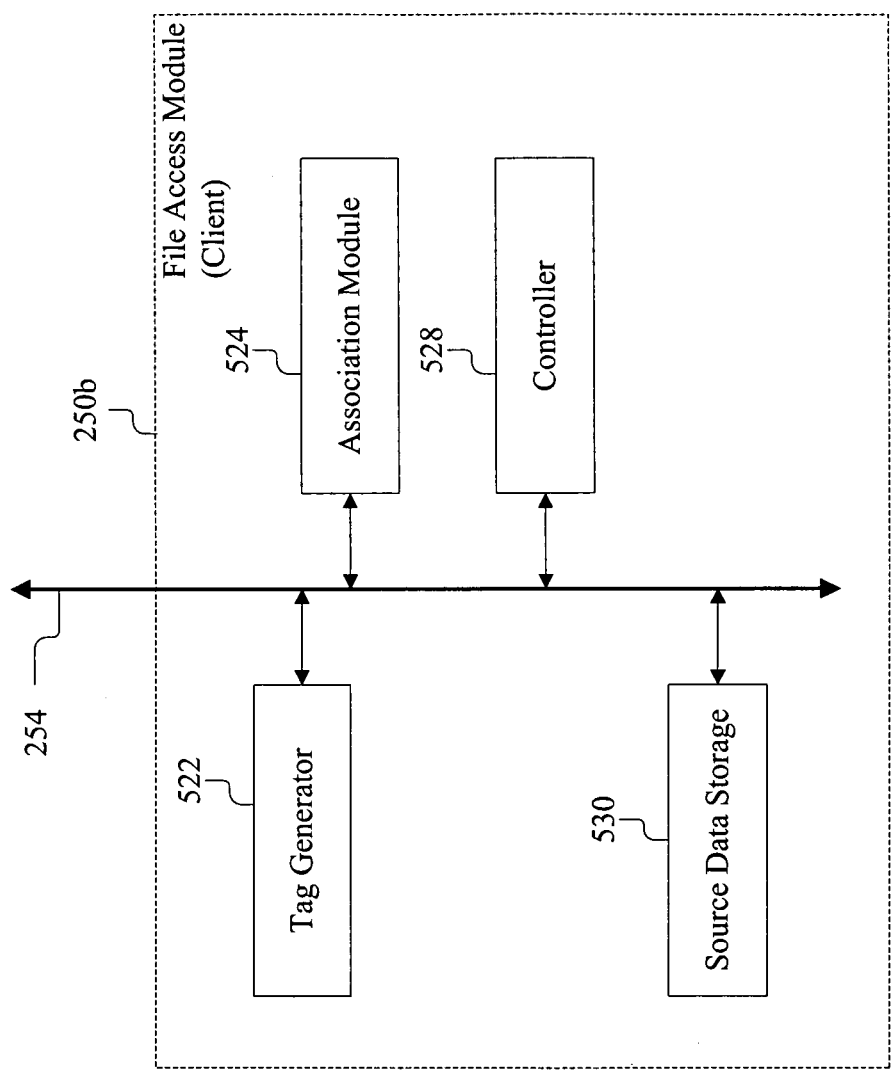
FIG. 5B is a block diagram of a second embodiment of the file access module in accordance with the present invention for use in a client.

FIG. 5B is a block diagram of a second embodiment of the file access module 250*b* of the present invention. The second and preferred embodiment of the file access module 250*b* is advantageously coupled to and operates in conjunction with the client 201. The second embodiment of the file access module 250*b* comprises a tag generator 522, an association module 524, a controller 528 and a source data storage 530 each coupled to a bus 254. These components are also coupled by bus 254 to the policy setting module 212 and the policy enforcement module 232 of the client 201. The policy setting module 212 and the policy enforcement module 232 of the client 201 were described above with reference to FIG. 2B. The tag generator 522, association module 524, and controller 508 operate in a similar manner to that described above with reference to the server side, however, they work with the policy setting module 212 and the policy enforcement module 214 to control access to files at the mobile client device 201.

The file access module 250*b* also includes source date storage 530. The source data storage 530 can be used to store tags or labels created by the tag generator 522 at the mobile client device 201. In one embodiment, the tags are created and stored at the mobile client device 201 in the source data storage 530 for use repeatedly in determining whether a file should be made visible or accessible. Such tags can be re-used for as long as the files or data are stored on the on the mobile client device 201. In an alternate embodiment, no such source date storage 530 is needed because the tag generator 522 generates the source information on the fly as the requests for file access or visibility are received. The source data storage 530 is coupled by the bus 254 to the controller 528 and to the policy setting module 212 and the policy enforcement module 214.

The methods described below with reference to FIGS. 6-9 operate either at the server 200 or the client 201 as has been noted above. However, for convenience and ease of understanding they will be described with reference to the embodiment of the present invention of FIGS. 2B and 5B where the file access control module 250*b* resides at the client computing device 201.

Figure 6:
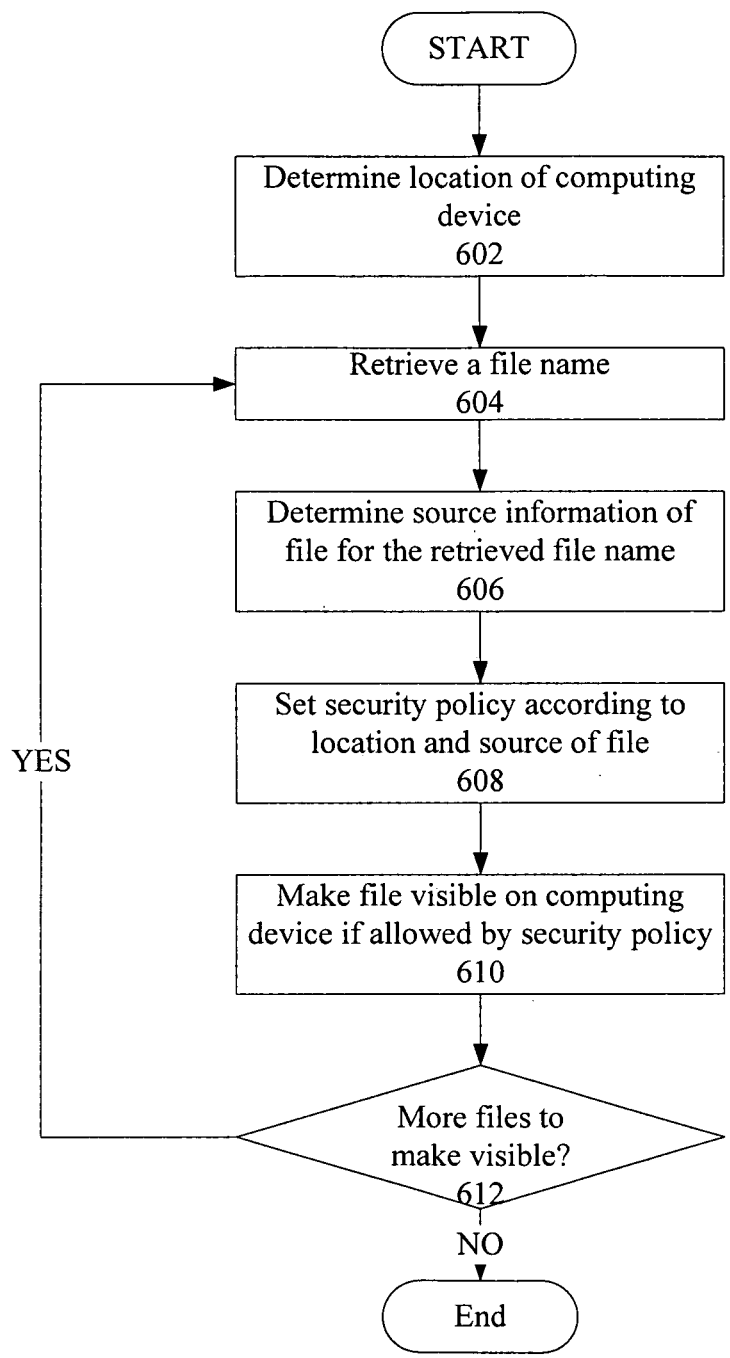
FIG. 6 is a flowchart illustrating a method for making data visible by a mobile device based on a location and source information about the data in accordance with the present invention.

Referring now to FIG. 6, a method for making data visible by a mobile client computing device 201 based on a location and source information about the data is described. The method begins in step 602 by determining the location of the mobile client device 201. As noted above the location, can be a physical location of the mobile client device 201, but more preferably reflects the network environment in which a mobile device 201 is operating. Next, a file name to be made visible is retrieved 604. Then the present invention determines 606 the "source information" for the file corresponding to the retrieved file name. The source information can be determined by generating the source information by the tag generator 522, retrieving the source information from the source data storage 530, or getting the source information from the file access module 250a. Once the source information has been determined or obtained 606, it is used by the policy setting module 212 to set 608 security policies enforced by the policy enforcement control module 214. Whether this file is visible to the user is determined by the security policy in force that takes into account both the location of the client computing device 201 and the source information associated with the file. Once the policy is set 608, the system 201 makes the file visible on the mobile client device 201 if allowed by the security policy as determined by the policy enforcement control module 214. Finally, the method determines 612 whether there are more files to make visible by the mobile client device 201. If so, the method proceeds to step 604 and repeats steps 604-612 for each additional file name. If not, all the files that can be have been made visible to the user based on the new location, and the method is complete.

Figure 7:
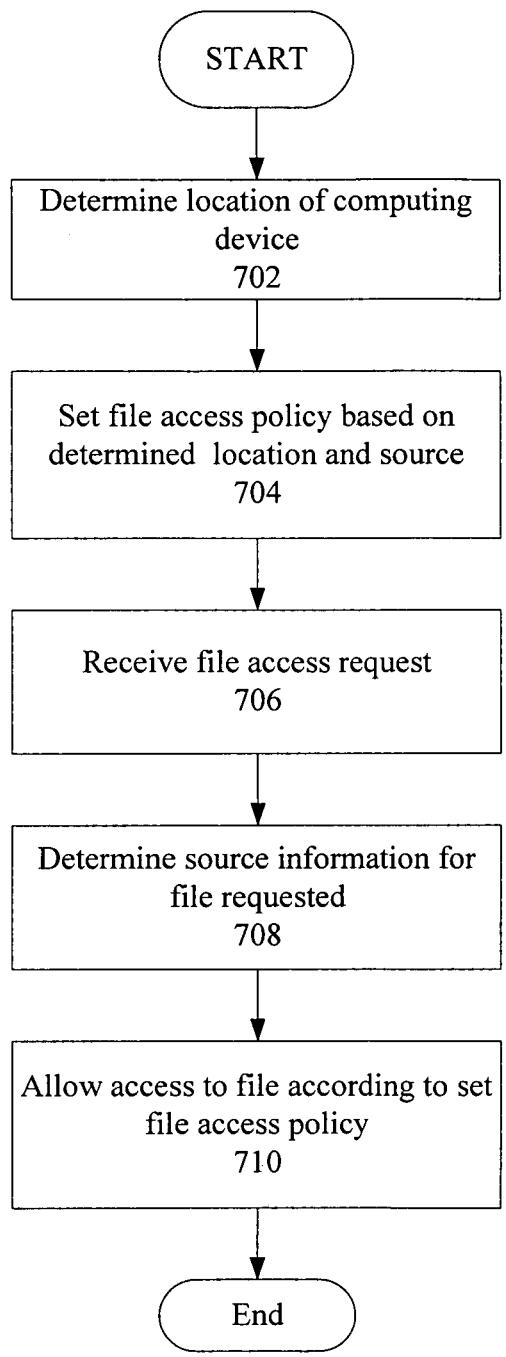
FIG. 7 is a flowchart illustrating a method for making data accessible by a mobile device based on a location and source information about the data in accordance with the present invention.

Referring now to FIG. 7, the method for making data accessible by a mobile device based on a location and source information will be described. The method begins in step 702 by determining the location of the mobile client device 201. Again, the location can be a physical location of the mobile client device 201, but more preferably reflects the network environment in which a mobile device 201 is operating. Next, the method sets 704 security policies enforced by the policy enforcement control module 214 based on location and source information. Whether this file is accessible by the user is determined by the security policy in force that takes into account both the location of the client computing device 201 and the source information associated with the file. Next, a request for file access is received 706. Then the present invention determines 708 the "source information" for the file corresponding to the file access request. Again, the source information can be determined by generating the source information by the tag generator 522, retrieving the source information from the source data storage 530, or getting the source information from the file access module 250a. Finally, the mobile client device 201, in particular the policy enforcement control module 214, either allows 710 or prohibits access (reading or writing) to the file according to the file access policy set, the location and the source information.

Figure 8:
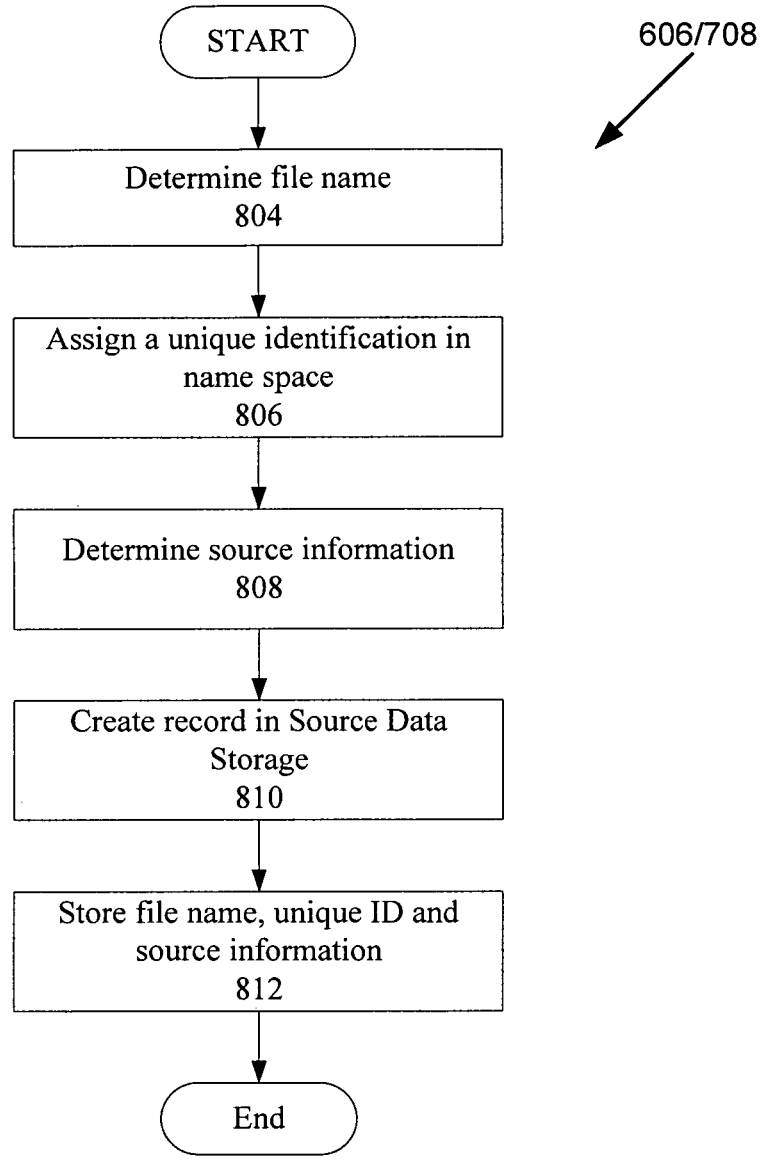
FIG. 8 is a flowchart illustrating a method for creating source information about data in accordance with the present invention.

FIG. 8 is a flowchart illustrating a method for creating source information about a file or data in accordance with the present invention. The method of FIG. 8 corresponds to step 606 of FIG. 6 or step 708 of FIG. 7. The method begins by determining 804 the file name of the file or data that mobile client device 201 is requesting be made accessible. Then the method assigns 806 a unique identification number in the name space to the file name. This is preferably done by the association module 504, 524. Then the tag generator 502, 522 determines 808 the source information for the file. For example, the tag generator 502, 522 determines the file name 402, a source address 404 and privileges 406 for the corresponding file. Next, the tag generator 502, 522 creates 810 in the source data storage a record 400a, 400b with fields as necessary for the source information. Finally, the method stores 812 the file name 402, a source address 404 and privileges 406 from the determining step 808 in the record 400a, 400b. In an alternate embodiment this information and the record can be directly sent to the policy enforcement module 214 for use in determining file accessibility.

Figure 9:
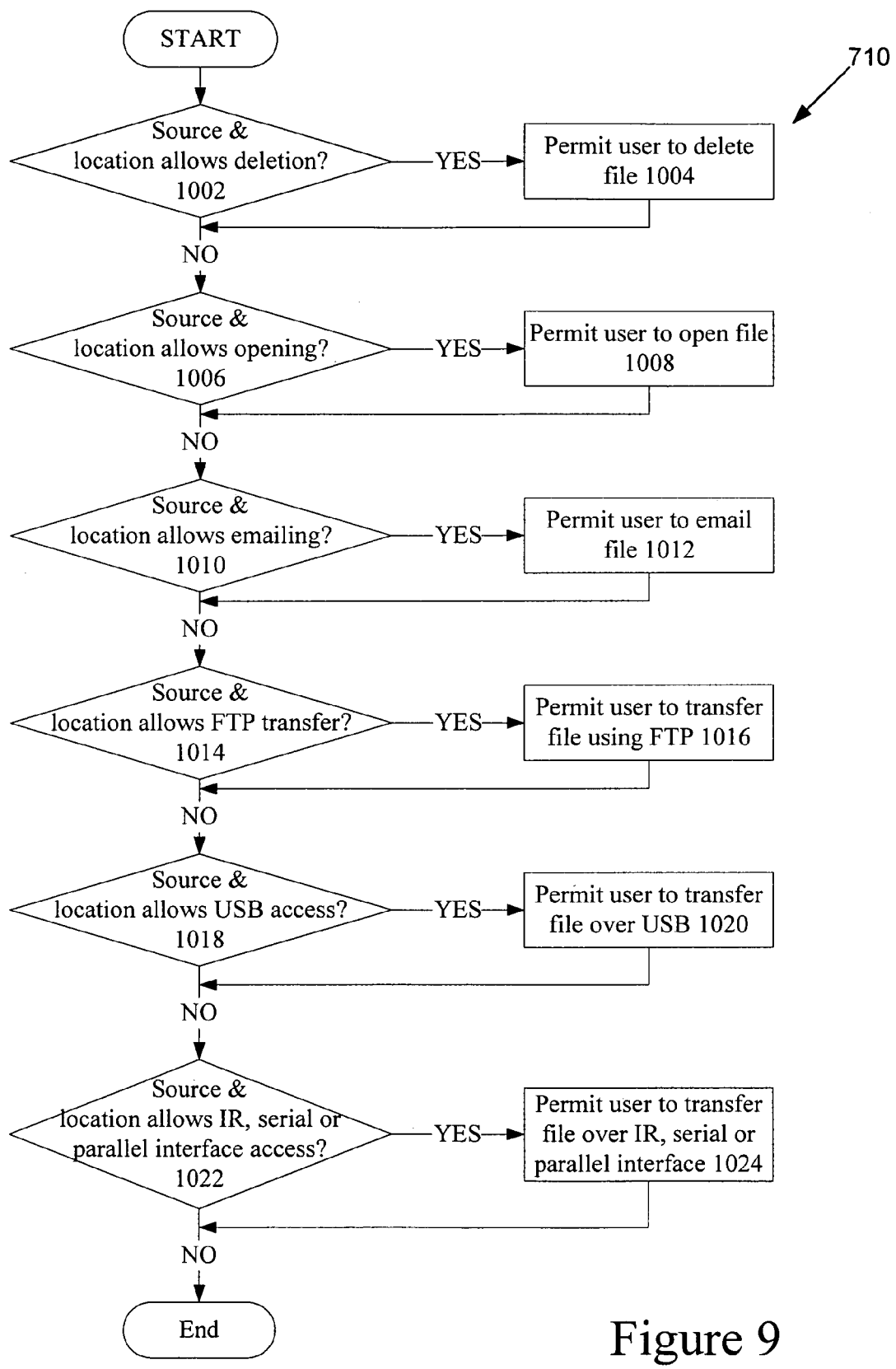
FIG. 9 is a flowchart illustrating a method for determining whether to allow access to a file using location and source information in accordance with the present invention.

FIG. 9 is a flowchart illustrating a method for determining whether to allow access to a file using location and source information. This method corresponds to step 710 of FIG. 7. Those skilled in the art will recognize that the present invention uses source information and location to determine if a file is accessible, and the method here provides a variety of steps covering the various methods for access and transfer of a file. The present invention includes other transfer methods not specifically recited here. Moreover, it should be understood that the order in which each of the transfer types are reviewed for allowability could be modified to provide various different ordering, and the order presented is only by way of example.

The method 710 begins in step 1002 by determining whether the policy adjusted for source and location information allows the file to be deleted. If so the method continues in step 1004 to permit the user to delete the file. If not the method continues to determine 1006 whether the policy adjusted for source and location information allows the file to be opened. If so, method continues to permit 1008 the user to open the file and view the data. If not the method continues step 1010 to determine whether the policy adjusted for source and location information allows the file to be sent via email. If so, the method permits 1012 the user to email the file. In steps 1014, 1016 the method determines whether file transfer using a file transfer protocol is allowable, and permits if it is. Similarly, the method test and allow if permissible access via universal serial bus, an infrared interface, a serial interface and a parallel interface in step 1018, 1020, 1022 and 1024.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Of course, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

Additionally, the present invention is in no way limited to implementation in any specific programming language, or for any specific operating system or environment. For example, one embodiment of the present invention is applicable to ad hoc peer-to-peer connections. Access using such connections could be allowed based on key length. Accordingly, the disclosure of the present invention is intended to be illustrative, but not limiting, of the scope of the present invention, which is set forth in the following claims.

The invention claimed is:

1. A method for making data accessible by a mobile computing device, comprising:
   determining one of a plurality of network environments in which the mobile computing device is operating without regard to a physical geographic location of the mobile computing device;
   receiving a request to access a file;
   determining source information for the file including identifying privilege information relating to data in the file, wherein the privilege information defines specific access control limitations on the file including the limitations of whether the file can be stored and/or viewed on the mobile computing device and what persons have access rights to the file, wherein the identifying privilege information includes identifying a group or groups of persons with whom a user requesting to access the file is associated;
   controlling access to the data in the file based on the determined one network environment in which the mobile computing device is operating and the determined source information for the file; and
   allowing access to the data in the file provided only if the privilege information satisfies a predetermined security policy for the determined one network environment.

2. The method of claim 1 wherein the allowing access to the data in the file further includes allowing access based on determining whether a security feature associated with the determined one network environment complies with the predetermined security policy.

3. The method of claim 1 wherein the source information includes a file name and a source address.

4. The method of claim 1 wherein the identifying privilege information relating to data in the file further includes identifying a person or group of persons that can or cannot access the data in the file and identifying actions the person or group of persons may take with the data in the file including the actions of file viewing, file storing or both.

5. The method of claim 3 wherein the source address includes one from the group of a subnet identifier, a server identifier, a folder name, and a file type.

6. The method of claim 5 wherein the source address includes one from the group of an owner of the file, version control information, a hash value, a cyclical redundancy check, and a digital signature.

7. The method of claim 1 wherein the request for file access is one from the group of reading a file, writing a file, viewing a file, emailing a file, transferring a file, and accessing a file using a universal serial bus, a serial port, a parallel port or an infrared interface.

8. The method of claim 1 wherein the step of determining the source information further comprises:
   determining the file name;
   assigning a unique identification number in a name space to the file;
   collecting source information about the file;
   creating a record in source data storage; and
   storing the unique identification number and the source information in the record.

9. A method for making a file visible on a mobile computing device, comprising:
   determining a network location of the mobile computing device based on a network environment in which the mobile computing device is operating without regard to a physical geographic location of the mobile computing device;
   identifying at least one security feature associated with the determined network location of the mobile computing device;
   retrieving a file name for the file;
   determining source information for the file including a source address and privilege information relating to data in the file, wherein the privilege information defines specific access control limitations on the file including the limitations of whether the file can be stored and/or viewed on the mobile computing device and what persons have access rights to the file, wherein the determining privilege information includes determining a group or groups of persons with whom a user requesting to view the file is associated;
   setting a security policy for the mobile computing device based on the privilege information at the determined network location and the identified at least one security feature associated with the determined network location; and
   making the file visible on the mobile computing device only if the privilege information at the determined network location and the identified at least one security feature associated with the determined network location satisfies the security policy.

10. The method of claim 9 wherein the identifying the at least one security feature associated with the determined network location further includes determining by a server computing system remote from the mobile computing device whether the determined network location is behind a firewall or not.

11. The method of claim 9 wherein the identifying the at least one security feature associated with the determined network location further includes determining whether the mobile computing device has a wired or wireless connection type.

12. The method of claim 9 wherein the source address includes one from the group of a subnet identifier, a server identifier, a folder name, and a file type.

13. The method of claim 12 wherein the source address includes one from the group of an owner of the file, version control information, a hash value, a cyclical redundancy check, and a digital signature.

14. The method of claim 9 wherein the step of determining the source information further comprises:
   determining the file name;
   assigning a unique identification number in a name space to the file;
   collecting source information about the file creating a record in source data storage; and
   storing the unique identification number and the source information in the record.

15. The method of claim 9, further comprising retrieving a second file name for a second file, and determining source information for the second file, and making the second file visible on the mobile computing device based on the determined network location and the determined source information for the second file.

16. An apparatus for protection of data accessible by a mobile computing device operating in one of a plurality of network environments, comprising:
   a tag generator for generating source information for a file in response to a request for access to the file, the source information including a file name, a source address and privilege information wherein the privilege information defines specific access control limitations on the file including the limitations of whether the file can be stored and/or viewed on the mobile computing device and what persons have access rights to the file, wherein the privilege information includes an identification of a group or groups of persons with whom a user requesting to access the file is associated;

an association module for managing a name space and providing an unique identification number that identifies a file in response to a signal from the tag generator, the association module coupled to the tag generator; and a controller coupled to the tag generator and the association module, the controller coupled to a policy enforcement module to provide source information useable by the policy enforcement module to control access to the file, wherein the policy enforcement module operates on a server and controls access to files on the server by the mobile computing device based on the privilege information and a security feature associated with the one of the plurality of network environments in which the mobile computing device is operating complying with a predetermined security policy, without regard to a physical geographic location of the mobile computing device; whereby the mobile computing device is granted access to the file only if the privilege information and the security feature comply with the predetermined security policy.

17. The apparatus of claim 16 further comprising a file request log for storing source information about files that have been accessed by the mobile computing device, the file request log coupled to the tag generator to receive the source information about the files that have been accessed by the mobile computing device.

18. The apparatus of claim 16 further comprising a source data storage for storing a record of source information, the source data storage coupled to the tag generator to receive the record of source information.

* * * * *